(12) United States Patent
Lightenberg

(10) Patent No.: US 8,471,822 B2
(45) Date of Patent: Jun. 25, 2013

(54) DUAL-SIDED TRACK PAD

(75) Inventor: Chris Lightenberg, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 852 days.

(21) Appl. No.: 11/470,579

(22) Filed: Sep. 6, 2006

(65) Prior Publication Data

US 2012/0235949 A1 Sep. 20, 2012

(51) Int. Cl.
*G06F 3/041* (2006.01)

(52) U.S. Cl.
USPC .......................................... 345/173

(58) Field of Classification Search
USPC .......................................... 345/173
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,009,153 A * | 12/1999 | Houghton et al. | 379/102.02 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,010,333 B2 * | 3/2006 | Trively | 455/575.3 |
| 7,015,894 B2 | 3/2006 | Morohoshi | |
| 7,046,230 B2 | 5/2006 | Zadesky et al. | |
| 7,176,894 B2 * | 2/2007 | Ostergård et al. | 345/168 |
| 7,184,064 B2 | 2/2007 | Zimmerman et al. | |
| 7,620,174 B1 | 11/2009 | Bick | |
| 7,663,607 B2 | 2/2010 | Hotelling et al. | |
| 2004/0135919 A1 | 7/2004 | Kim et al. | |
| 2005/0068304 A1 * | 3/2005 | Lewis et al. | 345/168 |

(Continued)

FOREIGN PATENT DOCUMENTS

CN 1479891 A 3/2004
GB 2 299 394 A 10/1996

(Continued)

OTHER PUBLICATIONS

International Search Report mailed Mar. 25, 2008, for PCT Application No. PCT/US2007/019551, filed Sep. 5, 2007, three pages.

(Continued)

*Primary Examiner* — Yong H Sim
*Assistant Examiner* — Randal Willis
(74) *Attorney, Agent, or Firm* — Morrison & Foerster LLP

(57) ABSTRACT

A system including a capacitive array element capable of sensing touch from either side is described. A connected processor unit, either in the device or the host system, may be adapted to interpret signals from the capacitive array element as a cursor or view movement with six degrees of freedom. The track pad device may include a display element and the capacitive array element may be translucent. The display element and the array element may be configured with respect to each other, where different configurations can be associated with different operating modes. For example, when the array element lies over the display screen so that the display screen is viewable through the array element, the array element can function as a touch screen. In another configuration, the array element may generate signals indicating a user's touch from one or the other or both sides of the array element.

44 Claims, 19 Drawing Sheets

U.S. PATENT DOCUMENTS

| | | | |
|---|---|---|---|
| 2006/0026521 | A1 | 2/2006 | Hotelling et al. |
| 2006/0026535 | A1 | 2/2006 | Hotelling et al. |
| 2006/0026536 | A1 | 2/2006 | Hotelling et al. |
| 2006/0033724 | A1 | 2/2006 | Chaudhri et al. |
| 2006/0053387 | A1 | 3/2006 | Ording |
| 2006/0085757 | A1 | 4/2006 | Andre et al. |
| 2006/0097991 | A1* | 5/2006 | Hotelling et al. ............ 345/173 |
| 2006/0181517 | A1 | 8/2006 | Zadesky et al. |
| 2006/0197750 | A1 | 9/2006 | Kerr et al. |
| 2006/0197753 | A1 | 9/2006 | Hotelling |

FOREIGN PATENT DOCUMENTS

| | | |
|---|---|---|
| GB | 2 348 075 A | 9/2000 |
| JP | 2000-163031 A | 6/2000 |
| JP | 2002-342033 A | 11/2002 |
| JP | 2003-067128 A | 3/2003 |
| WO | WO-02/35333 A1 | 5/2002 |
| WO | WO-2005/053287 A1 | 6/2005 |
| WO | WO-2005/114369 A2 | 12/2005 |
| WO | WO-2005/114369 A3 | 12/2005 |
| WO | WO-2008/030563 A2 | 3/2008 |
| WO | WO-2008/030563 A3 | 3/2008 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

U.S. Appl. No. 10/654,108, filed Sep. 9, 2003, entitled "Ambidextrous Mouse."

* cited by examiner

DUAL-SIDED TRACK PAD

CROSS-REFERENCE TO RELATED APPLICATIONS

This application is related to the following applications, which are all herein incorporated by reference: U.S. patent application Ser. No. 10/188,182, titled "TOUCH PAD FOR HANDHELD DEVICE," filed on Jul. 1, 2002; U.S. patent application Ser. No. 10/722,948, titled "TOUCH PAD FOR HANDHELD DEVICE," filed on Nov. 25, 2003; U.S. patent application Ser. No. 10/643,256, titled "MOVABLE TOUCH PAD WITH ADDED FUNCTIONALITY," filed on Aug. 18, 2003; U.S. patent application Ser. No. 10/654,108, titled "AMBIDEXTROUS MOUSE," filed on Sep. 2, 2003; U.S. patent application Ser. No. 10/840,862, titled "MULTI-POINT TOUCH SCREEN," filed on May 6, 2004; U.S. patent application Ser. No. 10/903,964, titled "GESTURES FOR TOUCH SENSITIVE INPUT DEVICES," filed on Jul. 30, 2004; U.S. patent application Ser. No. 11/038,590, titled "MODE-BASED GRAPHICAL USER INTERFACES FOR TOUCH SENSITIVE INPUT DEVICES," filed on Jan. 18, 2005; U.S. patent application Ser. No. 11/057,050, titled "DISPLAY ACTUATOR," filed on Feb. 11, 2005; U.S. patent application Ser. No. 11/115,539, titled "HAND-HELD ELECTRONIC DEVICE WITH MULTIPLE TOUCH SENSING DEVICES," filed Apr. 26, 2005; U.S. patent application Ser. No. 11/228,758, titled "VIRTUAL INPUT DEVICE PLACEMENT ON A TOUCH SCREEN USER INTERFACE," filed Sep. 16, 2006; U.S. patent application Ser. No. 11/228,700, titled "OPERATION OF A COMPUTER WITH A TOUCH SCREEN INTERFACE," filed Sep. 16, 2006; U.S. patent application Ser. No. 11/228,737, titled "ACTIVATING VIRTUAL KEYS OF A TOUCH-SCREEN VIRTUAL KEYBOARD," filed Sep. 16, 2006; U.S. patent application Ser. No. 11/048,264, titled "GESTURES FOR TOUCH SENSITIVE INPUT DEVICES," filed Jan. 31, 2005; U.S. patent application Ser. No. 11/367,749, titled "MULTI-FUNCTIONAL HAND-HELD DEVICE," filed Mar. 3, 2006.

FIELD OF THE INVENTION

The invention relates to track pad devices. In particular, the invention relates to systems and methods for translucent dual-sided track pad utilization.

BACKGROUND OF THE INVENTION

Many devices used in day-to-day life for various and divergent functions are essentially computers, or computing devices. Such devices typically include a computer processor and computer memory coupled by a bus. Such devices include, but are not limited to, Personal Digital Assistants ("PDAs"), telephones, media players, cameras, and Global Positioning Satellite ("GPS") modules as well as laptop computers and traditional desktop computers.

Many of the above devices are configurable. For example, a laptop may have a main body with a screen unit rotationally attached to the host device. Thus, the user may configure the screen at a desirable angle for viewing. The user may also protect the screen by "closing" the laptop, i.e., by rotating the screen unit against a keyboard portion of the host device where it is latched in that position. In another example, a cellular telephone may have an upper piece and a lower piece rotationally connected by a hinge as in a conventional "clam shell" design. The two pieces may be configured so that the two pieces are together ("closed") or apart ("open").

In many of the above devices, the mode of use results in or requires a certain configuration. For example, the laptop must typically be open to see the screen and use the keyboard. The cellular telephone typically must be open for the user to speak into microphone and have access to the telephone's earpiece.

Like most computers, these devices require an input tool and an output tool. Many types of input tools exist for performing operations in computers. Typical operations include moving a cursor and making selections on a display screen. Input tools may include a collection of keys or buttons, mice, trackballs, joysticks, touch pads, and touch screens. The input tool often varies according to the designed function of the computer, i.e., a computer designed to be used as a cellular telephone may have a specialized telephone keypad for that purpose, whereas a computer designed to be used as a laptop may have the standard "QWERTY" keyboard with function keys and keys for screen navigation.

Visual displays have become one of the most prevalent output tools. In mobile devices the visual display is typically a display screen, such as a Liquid Crystal Display ("LCD") screen, which is built into the main housing of the device or moveably (but permanently) attached to the main housing of the device. As with input devices, the display screen may be specially configured according to the purpose of the computer.

Both touch screens and touch pads have become increasingly popular input tools. Touch pads allow a user to make selections on a screen by making gestures on a touch pad with a finger or stylus. Touch screens allow a user to make selections on a screen by touching the display screen with a finger or a stylus. It is also possible for the user to make selections on the screen by making gestures, as with touch pads. Touch screens are therefore becoming more popular because of their ease of use and versatility of operation.

Other input devices, however, may sometimes be preferred to touch screens, such as in cases where it is important not to block a user's view of the touch screen with a hand or stylus when using an input device. If display elements are small, or if display elements rapidly change, a keyboard or touch pad may be more desirable than a touch screen. For example, while typing a document it is often desirable to see all the typed characters and to see changes to the characters as they are typed.

The desirability of a touch screen as an input tool for some tasks and another device, such as a touch pad, as an input tool for other tasks, has resulted in devices having redundant input tools. For example, some devices have both a touch screen and a keyboard. Other devices have both a touch screen and a touch pad. While such input devices make using the computer easier, the computer is more costly in terms of manufacturing and in terms of the space used on the computer for both input devices.

In some circumstances, having more than one input device being active at one time may cause unexpected behavior. For example, in the case where a touch screen is above a touch pad on the device, a user attempting to utilize the touch screen using a finger may brush against the touch pad with an arm, creating unexpected input signals from the touch pad to the computer and causing unexpected and possibly disastrous results. It is therefore sometimes desirable to dedicate one input device for one task and another input device for another task by automatically deactivating the undesired input device and automatically activating the desired input device in dependence upon the device's mode of use.

While it is advantageous in some circumstances to have only one input device activated at a time, it is advantageous in other circumstances for more than one input device to be simultaneously activated and to interpret or accept input from any of the devices according to the computer's mode of use.

A computing device's mode of use may be designated by commands from the user. However, this requires the user to take proactive and time-consuming steps. Setting a configuration for interpretation or acceptance of input from any of the input devices may be complicated and difficult to understand. Additionally, the user may feel this use of time is inefficient and may decide not to designate the mode of use, or the user may also forget to designate the mode of use. Either case leaves the user in danger of unexpected input from the undesired input device.

Thus, despite the availability of useful input tools, making the appropriate input tool available for the user remains a problem. It is therefore a goal of this invention to solve or at least reduce the problems associated with input tools on computing devices.

SUMMARY OF THE INVENTION

Disclosed herein is a track pad device including a capacitive array element capable of sensing touch from two surfaces and sending signals indicative of the touches. The capacitive array element may be a dual-sided panel that is capable of sensing touch from either side and sending signals indicative of the touches to a host device (e.g., a desktop computer, a laptop computer, a digital music player or a mobile telephone unit). The capacitive array element may be able to sense multiple simultaneous touches and distinguish on which side the touches occur. A connected processor unit, either in the device or the host system, may be adapted to interpret the signals as a cursor or view movement with six degrees of freedom.

In some embodiments, the track pad device includes a display element and the capacitive array element is translucent. The display element and the array element may be configured with respect to each other, possibly including a configuration where the array element lies over the display screen so that the display screen is viewable through the array element, in effect forming a touch screen. The device may have a touch screen mode of use activated by the device's being configured with the array element over the display screen which allows a one-to-one correspondence between the array element and the display screen. The device may interpret and respond to the signals from the array element in a configurable way.

In one embodiment of the invention a control apparatus for a device is provided. The control apparatus may be adapted to determine functionality according to the configuration of the array element and the display element. The configuration adopted by the user may be a natural extension of a mode of use, where the functionality is appropriate for that mode of use. For example, one or both sides of the array element may be activated or deactivated according to the configuration.

In another embodiment of the invention a track pad device which interprets and responds to the signals from the array element in a configurable way is provided. A group of particular settings controlling the device's functionality may be associated with a configuration.

DETAILED DESCRIPTION OF THE INVENTION

Figure 1A:
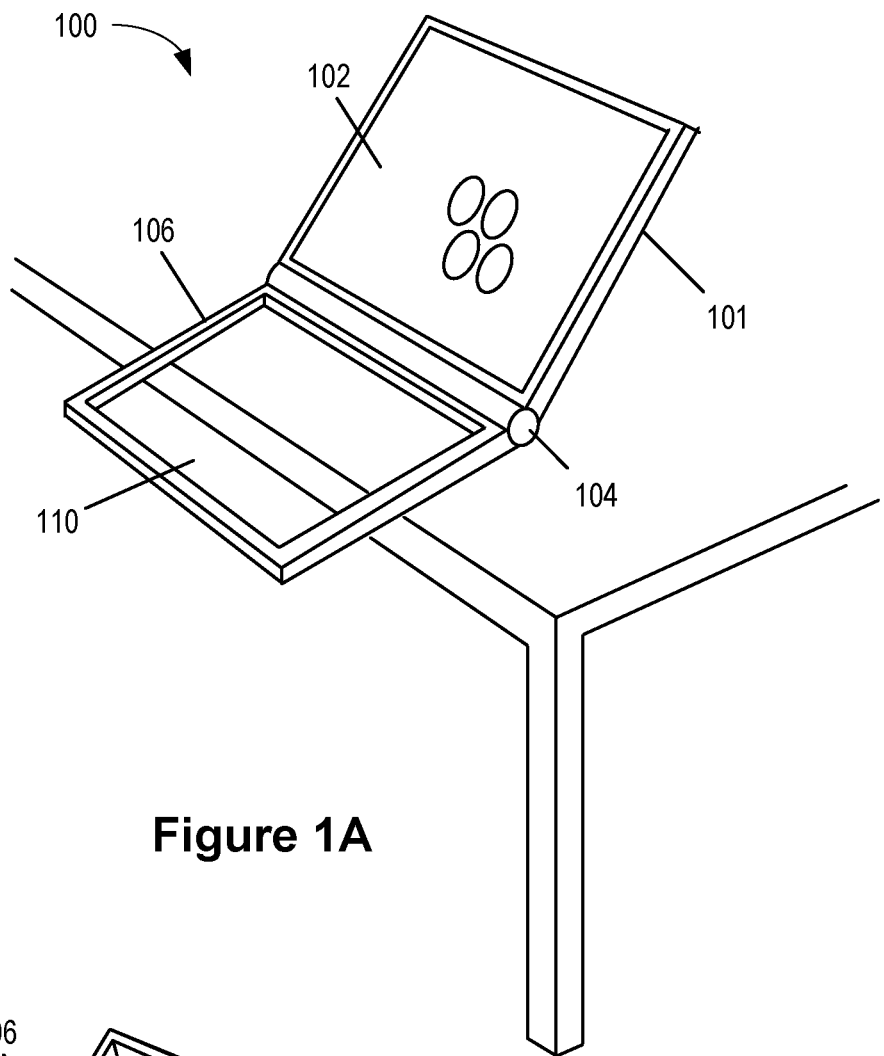
FIG. 1A shows the control apparatus in a first configuration from a perspective view.

Aspects of the present disclosure are described with reference to the accompanying drawings, beginning with FIGS. 1A and 1B. However, those of skill in the art will appreciate that the detailed description given herein with respect to these figures is for illustrative purposes, as the invention extends beyond these limited embodiments. Aspects of the present disclosure include a configurable track pad control apparatus for an electronic device, the apparatus having a display element and a translucent capacitive array element configurable with respect to one another. The array element has two surfaces capable of registering touch events. The display element, such as a display screen, and the array element may be configured with respect to each other, for example, by rotating them (to varying degrees) towards or away from each other on a hinge or sliding them on a common rail. In one configuration, the array element lays over the display screen so that the display screen is viewable through the array element, in effect forming a touch screen. Other aspects disclosed herein include a track pad device incorporating the above control apparatus.

The array element contains a sensing circuit which translates touch events into electrical signals indicative of where (and perhaps how hard) a user is touching the array element with, for example, her finger or a stylus. The sensing circuit is connected to a track pad controller, which is also connected to a host device. In one embodiment, the sensing circuit sends signals to the track pad controller which uses the signals to construct event information for transmission to the host device and eventual conversion into a computer event. In another embodiment, the track pad controller may construct the event information itself before transmitting the same to a host computer. In an alternative embodiment, the signals from the sensing circuit are converted to digital signals and sent directly to the hose device. In either embodiment, touch events are translated into computer events. The host device interprets the computer events and thereafter performs an operation based on the touch event, allowing the user to interact with a graphical user interface ("GUI") to move a pointer or cursor, select items, launch an application, etc.

The control apparatus or the host device may be adapted to determine functionality, in part, according to the configuration of the array element and the display element with respect to each other. Altering functionality may be carried out by ignoring input from one or both sides of the array element, by changing the way in which the input from the array element is interpreted, or by changing the response associated with the input. This configuration-dependent functionality may be implemented in the apparatus or in the host device. In various aspects of the present disclosure, the configuration may affect the acceptance or interpretation by the controller of signals from the sensing circuit, the transmission of signals from the controller to the host device, or the acceptance of, interpretation of, or response to the signals by the host device. For example, by configuring the control apparatus into a compact form for travel, the apparatus may cause that side of the array element which is not accessible by the user during travel to be deactivated, thereby curtailing unexpected behavior from the inaccessible array element.

The functionality of the control apparatus or the device may be configured according to a mode of use, which is associated with a particular configuration typically adopted by a user while in that mode of use. The functionality may be activated by the user's adopting this configuration, so that the functionality appropriate for a mode of use is automatically applied. For example, one mode of use may be a touch screen mode, allowing one-to-one correspondence between the array element and the display screen. This mode may be activated by the device being configured with the array element over the display screen.

In some aspects of the present disclosure, the functionality invoked by a particular configuration may be adjustable by a user. For example, a user may associate a group of particular settings controlling the device's functionality with a range of configurations in a "configurations file."

Figure 1B:
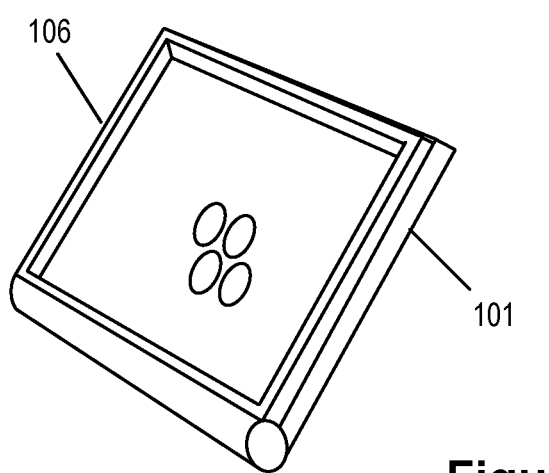
FIG. 1B shows the control apparatus in a second configuration from a perspective view.

Referring to FIGS. 1A and 1B, one aspect of the present disclosure is an exemplary track pad control apparatus for an electronic device. FIG. 1A shows the control apparatus 100 in a first configuration. The control apparatus 100 includes an array element 106 as a dual-sided input device and a display screen 102 as an output device. The array element is a translucent panel. The display screen 102 is incorporated into a host device 101 which is connected by a hinge 104 to the array element 106. The array element 106 and the host device 101 may be rotated with respect to one another on the hinge 104.

The control apparatus 100 may be configured by a user for viewing the display screen 102 through the array element 106 by rotating the array element 106 and the host device 101 towards each other so that the array element 106 is adjacent to the display screen 102, as shown in FIG. 1B. The translucent panel of the array element 106 is sufficiently transparent so that the display screen 102 may be viewed through the array element 106. Although the display screen 102 is incorporated into the host device 101 here, the display screen 102 may sometimes be configurable independent of the host device 101.

The display screen 102 may be implemented as an M-11 full LCD but may also be a light-emitting diode ("LED") display, an organic light-emitting diode ("OLED") display, or a polymer light-emitting diode ("PLED") display. The display screen 102 may be configured to display a graphical user interface ("GUI") such as, for example, a pointer or cursor as well as other information to the user.

Figure 2A:
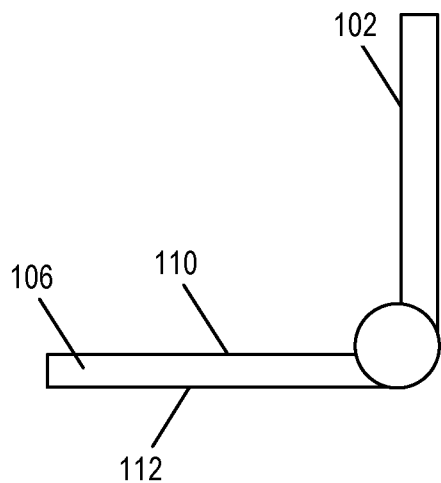
FIGS. 2A-C show the control apparatus in a various configurations from a side view.
Figure 2B:
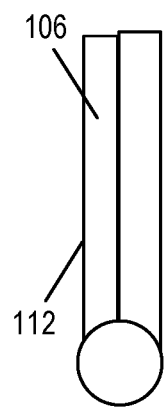
Figure 2C:
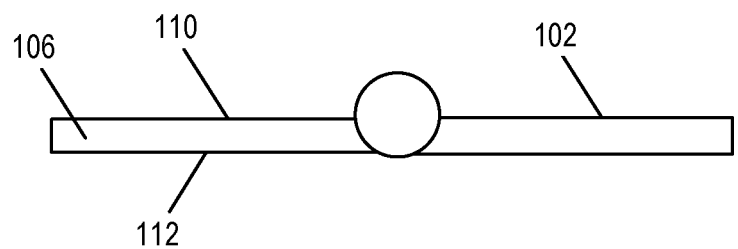

Referring to FIGS. 2A-C, the array element 106 has a first side 110 and an opposing second side 112. Each side 110, 112 of the array element 106 is a touch-sensitive surface, so that the array element 106 functions as a dual-sided array element, i.e., recognizing touch events coming from the first side 110 or the second side 112 of the array element 106. In some embodiments, the array element 106 can differentiate between a touch event coming from the first side 110 or the second side 112 of the array element 106.

The array element 106 includes a capacitive array made of a plurality of capacitance sensing nodes formed with a translucent conductive medium such as indium tin oxide ("ITO").

Figure 3:
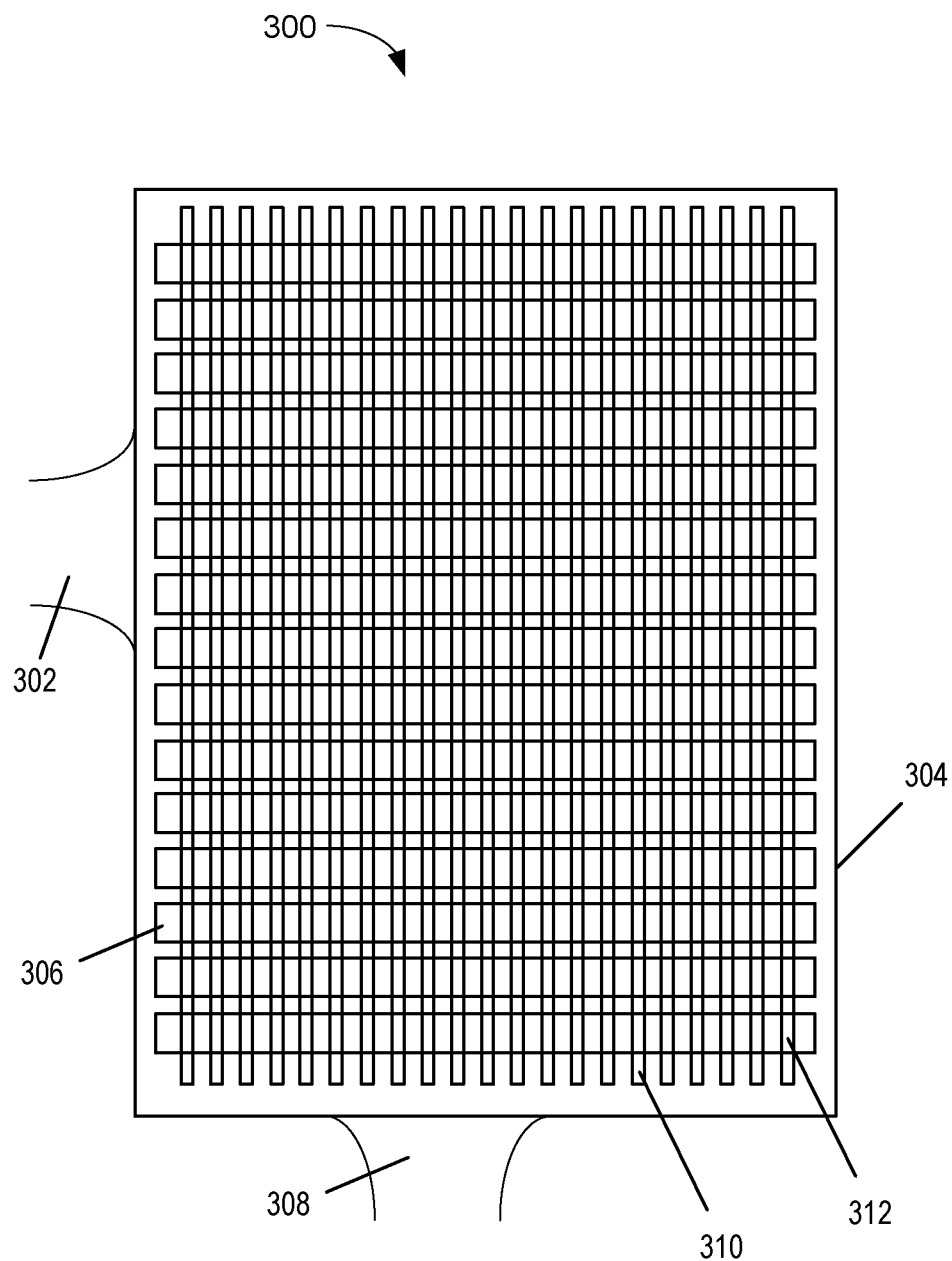
FIG. 3 illustrates a top view of an exemplary capacitive array in accordance with some embodiments of the present invention.

FIG. 3 is a top view of an exemplary capacitive array 300 in accordance with some embodiments of the present invention. The transparent conductive medium is patterned into a group of spatially separated lines 306, 310 formed on separate layers. The transparent conductive medium may be patterned on opposite sides of the same optical transmissive member 304 or on different members. The nodes 312 may be laid out in a Cartesian coordinate system, with the sensing lines 310 and driving lines 306 being perpendicular to one another. The driving lines 306 are positioned in rows and the sensing lines 310 are positioned in columns perpendicular to the rows. The rows extend horizontally to the sides of the panel, and the columns extend vertically to the top and bottom of the panel. In one embodiment, the pitch of the driving and sensing lines 306, 310 is approximately 5 mm. The line widths of the driving lines 306 may be about 5 mm and the line widths of the sensing lines 310 may be about 1 mm. The number of lines is dependent upon the size of the panel. Driving lines 306, connected to a voltage source through a flex circuit 302, are formed on a first layer. Sensing lines 310, being connected to a capacitive sensing circuit (such as a sensor circuit) through a flex circuit 308, are formed on a second layer. Although located in different layers and separated by a dielectric layer, the sensing lines 310 traverse or cut across the driving lines 306, thereby forming capacitive coupling nodes. One of ordinary skill in the art will recognize that sensing and driving lines may also be laid out in a polar coordinate system with, for example, sensing lines in concentric circles and driving lines radially extending through them from a central point.

In operation, current is driven through one driving line 306 at a time. When an object (e.g., a finger or stylus) is proximate to the node 312, for example, the object drains charge from the node, thereby affecting the capacitance at the node 312. The changes in capacitance that occur at each of the nodes 312 during a touch event produce distinct signals which may be used to generate an image of the touch screen plane at a particular point in time.

Figure 5:
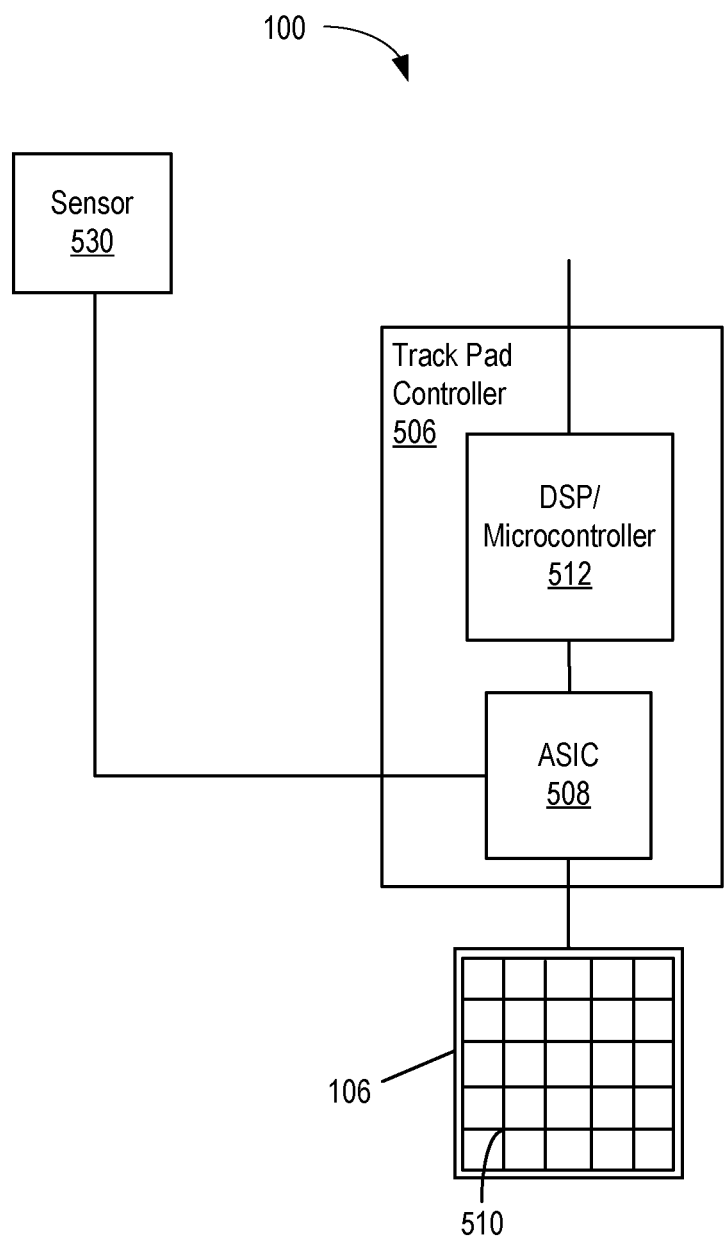
FIG. 5 shows a track pad control apparatus according to some embodiments of the present disclosure.

In one embodiment, upon recognizing touch events, the sensing circuit sends these signals to a track pad controller (506, FIG. 5). The track pad controller 506 converts these analog signals into digital signals and sends the event to an I/O controller (possibly via a digital signal processor ("DSP")), which converts the signals to computer events. A host device interprets the computer events and thereafter performs an operation based on the touch event, allowing the user to interact with the GUI, as is discussed in further detail below. In alternate embodiments, the sensing circuit sends these signals to the host device, where the host device's processor (614, FIG. 6) converts the signals to computer events and thereafter performs an operation based on the touch event as described below.

In some aspects of the present disclosure, the array element 106 can differentiate between a touch event coming from the first side 110 and an event from the second side 112 of the array element 106. The two sides of the panel may have capacitive arrays of differing dimensions. Such a panel may be adapted to generate one signal indicative of a change in capacitance when an object comes into close proximity with the first surface and a second signal indicative of a change in capacitance when an object comes into close proximity with the second surface.

Figure 4:
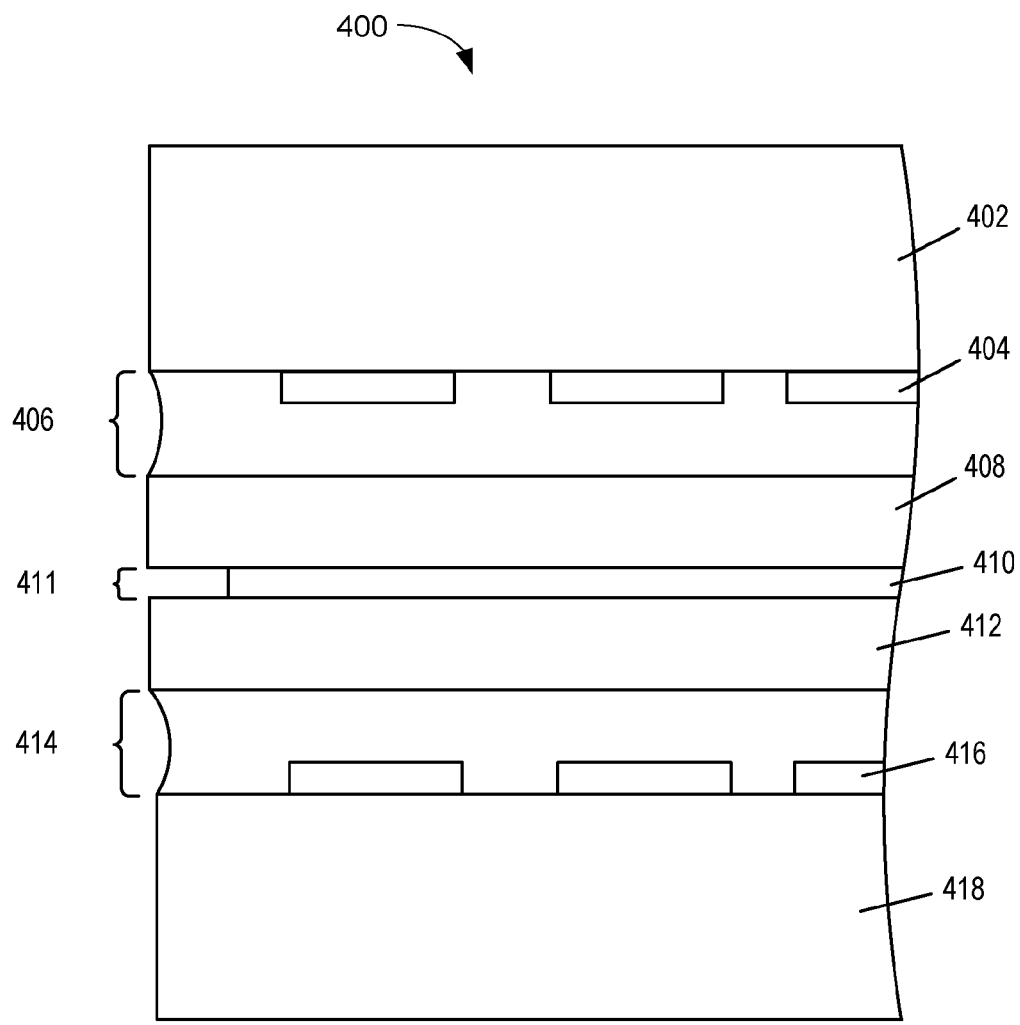
FIG. 4 shows, in cross section, a translucent panel in accordance with one embodiment of the invention.

FIG. 4 is a partial front elevation view, in cross section of a translucent panel, in accordance with such a panel. The translucent panel 400 includes driving lines 410 in a layer sandwiched between two layers containing sensing lines 404, 416. The panel 400 includes a translucent driving layer 411 positioned between two first glass members 408, 412. The driving layer 411 includes a plurality of driving traces 410 positioned in rows extending across the page. The two first glass members 408, 412 are a portion of the panel 400. The driving layer 411 is typically disposed on one of the first glass members 408, 412 using suitable transparent conductive materials and patterning techniques. The driving layer 411 may be coated with material of a similar refractive index to make visual appearance more uniform.

The panel 400 also includes two translucent sensor layers 406, 414 that are positioned on the two first glass members 408, 412 opposite of the driving layer 411. A second glass member 402, 418 is positioned on the other side of each of the two translucent sensing layers 406, 414. Each sensing layer 406, 414 is therefore sandwiched between a first 408, 412 and second glass member 402, 418. Each first glass member 408, 412 provides an insulating layer between the driving layer 411 and sensing layers 406, 414. The sensing layers 406, 414 include a plurality of sensing lines 404, 416 positioned in columns intersecting the driving lines 410 to form a plurality of capacitive coupling nodes. Like the driving layer 411, the sensing layers 406, 414 are disposed on the two first glass members 408, 412 using suitable materials and patterning techniques.

In order to form translucent conductors on glass, film, or plastic, lines may be patterned by depositing an ITO layer over a substrate surface and etching away portions of the ITO layer to form traces. To prevent non-uniformities in appearance, the areas between the traces, instead of being completely removed, may be subdivided into unconnected electrically floating ITO pads, or "dead areas" with a small (e.g., 10 micron) gap etched between them.

FIG. 5 shows a track pad control apparatus according to some aspects of the present invention. The track pad control apparatus 100 includes array element 106, which is operatively coupled to a track pad controller 506. In one embodiment, the array element 106 interfaces with an application specific integrated circuit ("ASIC") 508 that stimulates the sensor 510 and reads the raw sensor output as described in more detail below. The ASIC 508 interfaces via signaling with a digital signal processor ("DSP") and/or microcontroller 512, which generates the capacitance images. Together the ASIC 508 and DSP/microcontroller 512 form the track pad controller 506.

DSP/Microcontroller 512 includes an interface for accepting signals from the ASIC 508, extracting features (i.e., touch points), and passing the data as high-level information to the host device (not shown). Further details regarding DSP/Microcontroller 512 may be found in pending U.S. patent application Ser. No. 11/381,313, titled "MULTIPOINT TOUCH SURFACE CONTROLLER," filed May 2, 2006.

In normal operation, the array element 106 sends signals to a track pad controller 506 for transmission to the host device and eventual conversion into a computer event. In one aspect of the present invention, however, the rotational configuration of the translucent panel with respect to the display screen may determine the activation status (enabled or disabled) of control apparatus functions. In this embodiment, a sensor may be connected to the track pad controller or the host device, Referring again to FIG. 5, in one embodiment a sensor 530 producing signals carrying configuration data is connected to the track pad controller 506, so that the track pad controller 506 produces signals in dependence upon the configuration of the translucent panel with respect to the display. For example, the sensor 530 may hold a voltage high for an "on" signal, and hold the voltage low for an "off" signal, or vice versa. In the track pad control apparatus 100 of FIG. 5, the sensor 530 is connected to ASIC 508 which is configured to respond to an off signal (indicating, for example, that display screen 102 in FIG. 1 is closed against 106) from the sensor 530 by not sending any signals, or by sending a null signal, to the DSP/microcontroller 512. The lack of signal or null signal is passed on the host device, which may be configured to interpret the null signal as no input.

FIGS. 2A-C show three of a virtually infinite number of possible configurations into which the track pad control apparatus 100 may be configured by a user. The track pad controller 506, in dependence upon signals received from a sensor connected to the hinge 104 (for example), either activates or deactivates the touch screen controller. Returning to FIG. 2A, the track pad control apparatus is in a 90-degree "standard open" position, which results in an "on" signal from the sensor to the touch screen controller. Thus the touch screen controller is activated, and it may perform its functions as described above. In FIG. 2B, the apparatus is in a "closed" position, which results in an "off" signal from the sensor to the touch screen controller. Thus, the touch screen controller is deactivated, and it will not transmit touch events to the host device. In FIG. 2C, the controller is in a 180-degree "flat open" position, which results in an "on" signal from the sensor to the touch screen controller, as described above.

The track pad control apparatus 100 discussed in detail above is but one embodiment of the present invention. As previously mentioned, the track pad control apparatus 100 includes an array element 106 and a display screen 102, which are often incorporated into a host device 101. Another embodiment of the present disclosure, therefore, is an exemplary track pad device featuring the control apparatus discussed above with reference to FIG. 1A.

Figure 6:
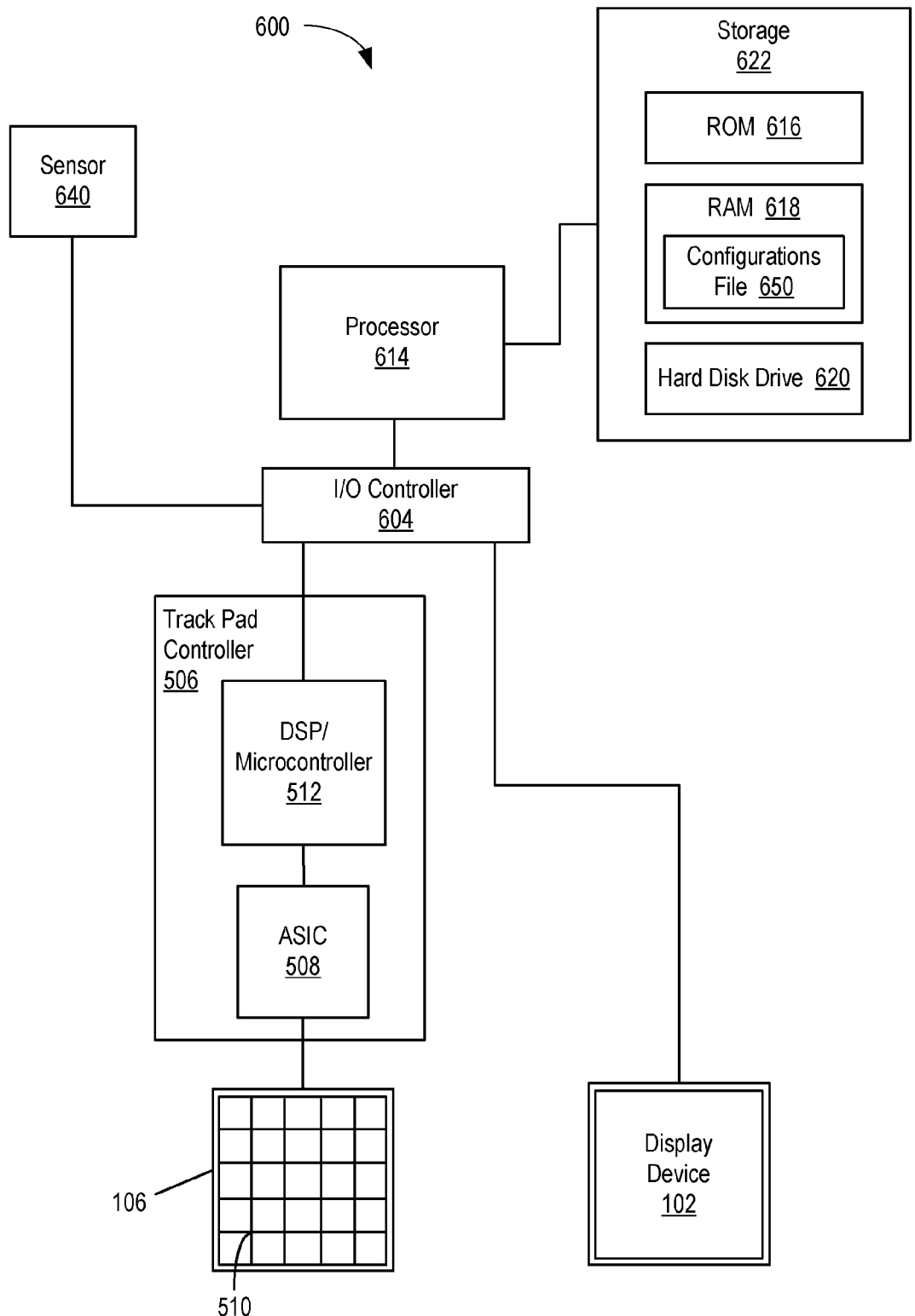
FIG. 6 shows a track pad device according to some embodiments of the present disclosure.

FIG. 6 is a system diagram of an exemplary track pad system 600. Track pad system 600 may be any computing device, such as a desktop, laptop, tablet, handheld computer, mobile phone, or digital audio player. The track pad system 600 could also be a public computer system such as an information kiosk, automated teller machine ("ATM"), point of sale machine ("POS"), industrial machine, gaming machine, arcade machine, vending machine, airline e-ticket terminal, restaurant reservation terminal, customer service station, library terminal, learning device, etc.

Track pad system 600 includes a processor 614 configured to execute instructions and to carry out operations associated with the array element 106. For example, using instructions retrieved from storage 622, the processor 614 may control the reception and manipulation of input and output data between components of the computing system. The processor can be implemented as one or more chips or multiple electrical components, including a dedicated or imbedded processor, a single purpose processor, a controller or an ASIC. The processor may execute computer code and carry out operations with the aid of an operating system, which are well known prior art. The operating system may be a special purpose operating system used for limited purpose appliance-type computing devices, or a general operating system like Unix,® Linux,® Palm OS,® and so on. (UNIX is a registered trademark of Unixsystem Laboratories, Inc. of Basking Ridge, N.J. LINUX is a registered trademark of Linus Torvalds of Portland, Oreg. PALM OS is a registered trademark of Palm Trademark Holding Company, LLC of Sunnyvale, Calif.)

Computer code and data required by processor 614, such as the operating system, are generally stored in storage 622, which is operatively coupled to processor 614. Storage 622 may include read-only memory ("ROM") 616, random access memory ("RAM") 618, hard disk drive 620, and/or removable storage media such as CD-ROM, PC-card, floppy disks, and magnetic tapes (not shown). Any of these storage devices may also be accessed over a network. A configurations file 650 may be stored in RAM 618, ROM 618 or on disk drive 620 which the processor 614 may access to obtain "settings" stored therein. Track pad system 600 also includes a display screen 102 that is operatively coupled to the processor 614. Display screen 102 may be any of a variety of display types including the LED displays discussed above, liquid crystal displays (e.g., active matrix, passive matrix, etc.), cathode ray tubes ("CRT"), plasma displays, etc.

As shown in the embodiment of FIG. 6, track pad system 600 includes array element 106, which is operatively coupled to the processor 614 by an I/O controller 604 and track pad controller 506. The track pad controller 506 may be integrated with the processor 614 or I/O controller 506 or it may be a separate component.

In one embodiment, the array element 106 interfaces with an ASIC 508 that stimulates the drive lines in array element 106 and reads the raw sensor output as described in more detail below. The ASIC 508 interfaces via signaling with a digital signal processor ("DSP") and/or microcontroller 512, which generates the capacitance images. In the illustrated embodiment, DSP/Microcontroller 512 includes an interface for accepting the signaling from the ASIC 508, extracting features (i.e., touch points), and passing the data as high-level information to the I/O controller 604.

The display screen 102 is typically configured to display a GUI that provides an easy to use interface between a user and the operating system or application running on the device. In general, the GUI represents programs, files, and operational options with graphical images, such as windows, fields, menus, icons, buttons, scroll bars, cursors, and so on. The graphical images may be arranged dynamically or according to a predefined layout. During operation, the user can select and activate various graphical images in order to initiate functions and tasks associated with the image.

In one aspect of the invention, the rotational configuration of the array element with respect to the display screen may enable or disable control apparatus functions. In other aspects, however, a sensor 640 provides data regarding the configuration of the translucent panel element 106 and the display element 102, or configuration data, to the processor, where the processor may execute operations based on the configuration data (e.g., file 616). This configuration data may be sent as signals through the I/O controller 604. The sensor 640 may also transmit signals to the ASIC 508 or the DSP/Microcontroller 512 which are, in turn, sent to the processor 614 through the I/O controller 604.

In various embodiments, the functionality of the device with respect to the spatial relationship of the elements may be configurable. The user may adjust the pre-defined ranges and the resulting functionality, which may be stored as "settings" in a configurations file. For example, the user may establish ranges for which input from the translucent panel will be enabled or disabled. These settings may be identified according to a mode of use, such as "mobile," "touch screen," "standard," and so on.

Returning to FIGS. 2A and 6, when the elements 102 and 106 are moved to a 90-degree "standard open" position with respect to one another, a signal is transmitted from sensor 640 to I/O controller 604 indicating this arrangement. Later, the processor may receive a computer event indicating a new configuration and carrying data about the new configuration. The event may prompt the processor to compare the configuration data with a pre-defined range and use the range to determine the correct operation, which is to enable input from the translucent panel. If the range is configurable by the user, the processor may perform a look-up in a configurations file to identify the pre-defined range. Referring now to FIGS. 2B and 6, for example, when the display screen 102 and array element 106 are moved to a "closed" position, a "0 degree" signal from the sensor 640 to the processor 614 is sent. The processor may again compare the data to the pre-defined range to determine the correct operation, which could be to disable input from the translucent panel 106.

In other embodiments of the invention, input from either side of the translucent panel 106 may be configured to be enabled or disabled independently of the other side. For example, if the configuration data indicates that the display screen 102 and array element 106 are in a 90-degree "standard open" position as shown in FIG. 2A, the processor may be configured to accept input generated from the first side 110 of the translucent panel and ignore input from the second side 112. If, on the other hand, the configuration data indicates that the display screen 102 and array element 106 are in 0-degree "closed" position, as shown in FIG. 2B, the processor may be configured to accept input generated from the second side 112 of the translucent panel and ignore input from the first side 110.

It may be advantageous in some circumstances to control touch pad input with a higher granularity than simply activating and deactivating the input. Some embodiments of the present invention therefore include changing the way in which touch pad input is interpreted according to the configuration. Changing input interpretation may be carried out by changing the context in which input is interpreted. A display device is typically configured to display a GUI that provides an easy to use interface between a user and the operating system or application running on the device. During operation, the user can select and activate various graphical images in order to initiate functions and tasks associated with the image. In most configurations, the GUI typically includes a pointer which may be manipulated by gestures on the translucent panel. When the track pad element is positioned directly over the display element (as in the "closed" position of FIG. 2B), however, the processor may be configured to enter a mode of operation in which touch events are interpreted through a GUI without the use of a pointer. This "touch screen" mode of operation may enable a GUI context for interpreting input in which touch events on the translucent panel or track pad element are interpreted in a one-to-one correspondence with images on the display. While using the track pad device in this mode, the user may select and activate various graphical images by touching the track pad element over the image.

Configuration data may also be used to determine the device's method of processing touch events. Referring again to FIG. 6, in one embodiment, for example, the track pad system 600 is configured to recognize multiple touch events that occur simultaneously at different locations on the either side 110, 112 of the array element 106, called multipoint touch functionality. Numerous examples of multipoint touch functionality are disclosed in pending U.S. patent application Ser. No. 10/840,862, titled "MULTIPOINT TOUCH SCREEN." It is sometimes advantageous, however, to disable this functionality. For example, automatically disabling multipoint touch functionality while traveling with the system 600 may drastically reduce unexpected input from the array element 106. For a user who typically travels with the device in a "closed" position, automatically disabling this functionality when the device is closed may prevent unexpected behavior. Therefore, in some embodiments of the invention, the track pad device may automatically disable multipoint touch functionality upon receiving configuration data that the device is closed.

Track pad devices in accordance with the invention may also control multiple touch event functionality according to configuration data with even more granularity. That is, the way in which multiple touch events are recognized by the track pad device may be determined by configuration data. For example, the processor 614 may use configuration data in determining the digital signal processing methods used by the track pad device to recognize multiple touch events. These digital signal processing methods include methods for filtering raw data, methods for generating gradient data, methods for calculating the boundaries for touch regions based on the gradient data, and methods for calculating the coordinates for each touch region. Raw data, as used herein, indicates unfiltered data typically in digitized form including values for each node of the touch screen indicating the level of capacitive coupling. For example, the values may be from 0 to 256, where 0 equates to the highest capacitive coupling and 256 equates to the lowest capacitive coupling. As used herein, gradient data indicates the topology of the touch pad signal generated by the touch pad device. Thus, gradient data comprises the capacitive values for each point on the track pad's surface (either or both sides) where the capacitive value is reflective of the change in capacitance due to something touching or coming into close proximity to the touch pad occurring at each point during a touch event.

In some embodiments, a track pad device in accordance with the invention recognizes gestures applied to the translucent panel to control aspects of the computer system based on these gestures. In these embodiments, a GUI may be enabled to use gestures incorporating simultaneous touch events on both sides of the touch pad, or dual-sided gestures. This GUI may be adapted to interpret the gestures from both sides so as to allow six degrees of freedom by translating gestures into translational cursor movement along a combination of three orthogonal axes as well as rotational cursor movement about three axes (e.g., pitch, yaw, and roll). For example, gestures on one side may be used to control translational movement while gestures on another side may be used to control rotational movement. Straight movement of the user's hand across the first surface could be interpreted cursor movement in a plane of the display, while cursor movement perpendicular to that plane could be accomplished with more complex gestures such as the "zoom-in" and "zoom-out" gestures explained in detail in U.S. patent application Ser. No. 11/018,590, titled "MODE-BASED GRAPHICAL USER INTERFACES FOR TOUCH SENSITIVE INPUT DEVICES," filed on Jan. 18, 2005. Similarly, the user could effect three types of rotational movement with a combination of straight dragging movements across the second surface for rotation around two axes and specialized gestures on the second surface for rotation around a third axis.

Cursor movement, as defined with respect to gesture interpretation, includes any graphic interaction in a three dimensional space such as moving an object or pointer, changing the perspective of a displayed view, enlarging or decreasing the size of an image, adjusting which portion of an image is displayed, and so on. It will be recognized that inherent to this embodiment is the ability of the track pad controller 506 to distinguish touch events from one side of array element 106 from touch events from the other side of array element 106. This functionality enables or enhances panning, scrolling, zooming, and selecting and may be used to add greater control and ease-of-use in applications requiring three dimensional maneuvering, such as computer assisted design ("CAD"), gaming, and multimedia editing applications.

A gestural operation program generally recognizes the occurrence of gestures and informs one or more software agents of the gestures and what actions to take in response to the gestures. The gestures may be identified as commands for performing actions in applications stored in memory, modifying GUI objects shown on the display, or modifying data stored in memory. This gesture functionality may be carried out in accordance with configuration data. For example, the process the track pad device employs to identify multipoint gestures may be determined in dependence upon the configuration data. The track pad device may use configuration data to determine the segregation by the track pad device of multiple touches into gestural inputs. The number of simultaneous multipoint gestures accepted by the track pad device may also be determined in accordance with configuration data. Configuration data may also be used to select the available set of gestures which are capable of being identified by the track pad device or to determine the computer operation associated with the multipoint gesture by the track pad device, such as launching an application, opening a file, and so on.

In some embodiments, configuration data within certain parameters may enable the restriction of touch recognition by the track pad device to a user interface element. A user interface element is a specific subset of the track pad element from which touch events will be accepted as input, typically denoted by a graphical image on the display behind the track pad with the same boundaries. In other embodiments, a track pad device may be adapted to respond to a gesture initiated during the execution of another gesture. This functionality may be enabled or disabled in accordance with configuration data. In still other embodiments, a track pad device in accordance with the invention controls device-specific functions according to configuration data. By device-specific function, we mean that the function is closely tied to the functional purpose of the device itself. For example, a track pad device may be implemented as a cellular telephone. Functions pertaining to making and answering telephone calls, as well as functions related to "phone book" features of the telephone, are device-specific functions for the telephone.

Figure 7A:
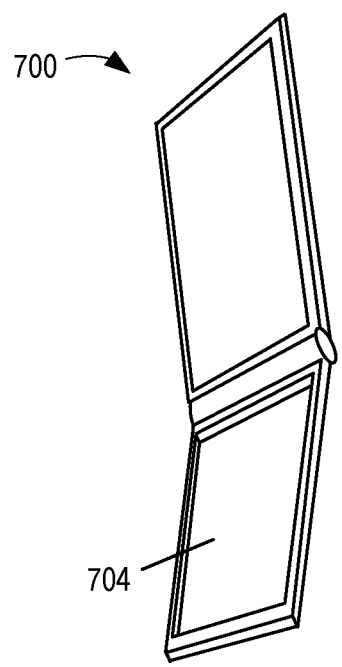
FIG. 7A shows a perspective view of cellular telephone in an open position.
Figure 7B:
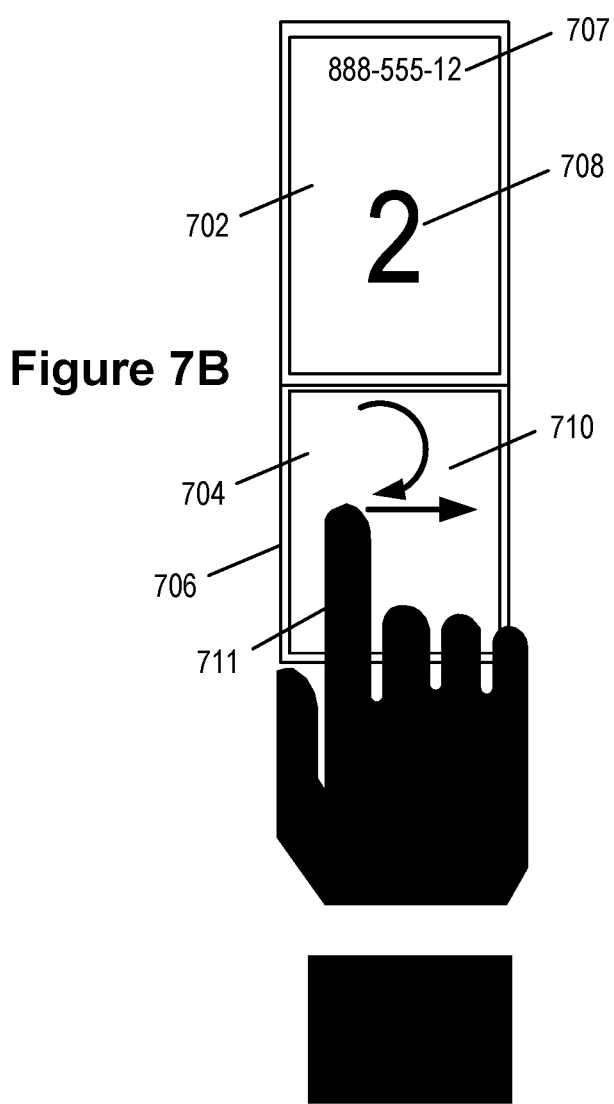
FIG. 7B shows a screen shot of cellular telephone in an open position.
Figure 7C:
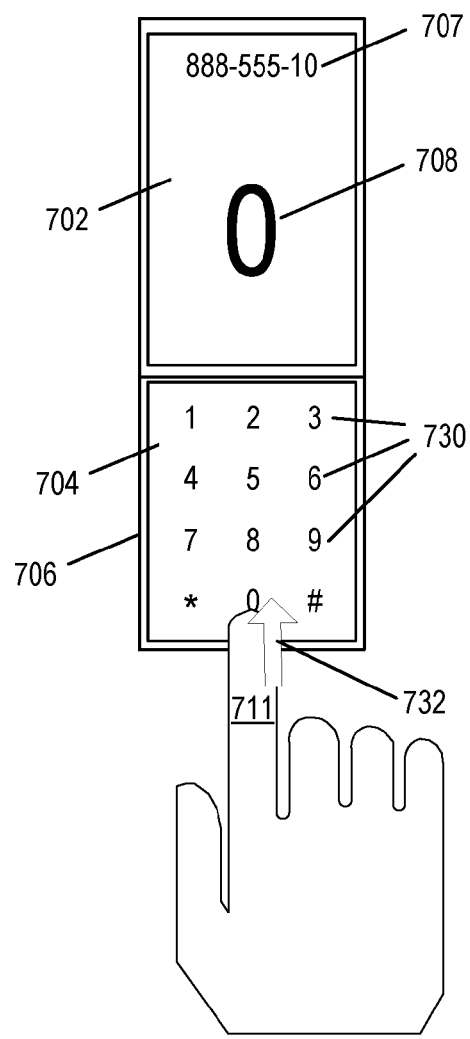
FIG. 7C shows a screen shot of cellular telephone in an open position.

FIGS. 7A-D illustrate a track pad device in accordance with the invention implemented as a cellular telephone configured for searching an address book while the telephone is in a closed position (FIG. 7D) and making telephone calls in an open position (FIGS. 7B and 7C). The configuration data may therefore be used to determine if the telephone is in a closed position, and cause the address book to be executed if so. FIG. 7A shows a perspective view of cellular telephone 700 in accordance with one embodiment of the invention in an open position. FIGS. 7B and 7C show a view of cellular telephone 700 in an open position. As shown in FIG. 7B, placing a telephone call may be carried out while the cellular telephone 700 is in an open position by tracing 710 each digit of the telephone number to be dialed on a first side 704 of the array element 706 with a finger 711, or other implement. The interpretation of touch events into numbers or text may include gesture software components specially adapted for recognizing relative motion (i.e., dragging an implement across the touch screen) to allow for fine gesturing. A GUI representation 708 of the traced digit is displayed on the display screen 702 as it is traced. A GUI representation 707 of the previously traced digits making up a phone number to be dialed is also displayed on the display screen 702.

As shown in FIG. 7C, the first side 704 of the array element 706 on the telephone 700 may include markings 730 configured as a standard telephone keypad. These markings 730 may be polarized 90 degrees out of phase with the LCD display or other polarized light source so as to be slightly visible when lit. Alternately, the markings may be implemented as LEDs.

Placing a telephone call may be carried out by pressing 732 each digit of the telephone number to be dialed on the corresponding marking 730 on the first side 704 of the array element 706 with a finger 711, or other implement. The interpretation of touch events into the dialed numbers may include gesture software components specially adapted for recognizing coarse pitch, but well-defined specific input locations to recognize number selections. The telephone 700 may be configured to use these software components and/or display the markings 730 upon the phone being in the open configuration, upon user activation, and so on. A GUI representation 708 of the pressed digit is displayed on the display screen 702 as it is pressed. A GUI representation 707 of the previously entered digits making up a phone number to be dialed is also displayed on the display screen 702.

Figure 7D:
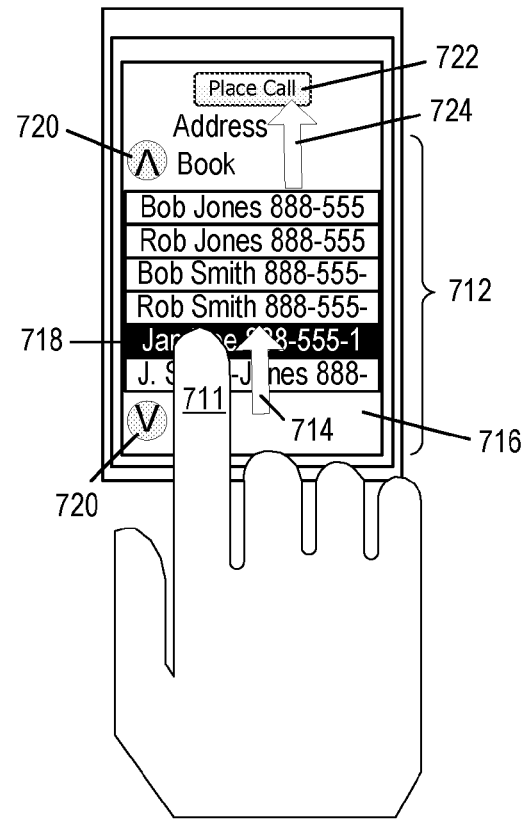
FIG. 7D shows a screen shot of cellular telephone in a closed position, with an address book graphical user interface initiated.

FIG. 7D shows the cellular telephone 700 in a closed position, with an address book GUI 712 initiated. In a closed position, the track pad element and the display screen function together as a touch screen. Calling a contact from the address book includes selecting GUI elements representing the contact number to be called while the cellular telephone 700 is in a closed position and, after selecting, initiating a telephone call to the selected contact. Selecting GUI elements representing the contact to be called may be carried out by pressing 714 on the second side of the touch pad 716 directly above the graphical representation of the contact 718 with a finger 711, or other implement. Toggling which contacts from the address book are displayed on the screen may be carried out by pressing the second side of the touch pad directly above one of the scroll button icons 720. Initiating a telephone call to the selected contact may be carried out by opening the telephone to automatically initiate the call or, alternatively, by pressing 724 on the second side of the touch pad 716 directly above the "Place Call" icon 722 with a finger 711, or other implement. The GUI may also be adapted to enable web browsing, document editing, or other PDA functions in the touch screen mode (not shown). The telephone 700 may be configured to interpret gestures with gesture software components specially adapted for recognizing relative motion, as described above, when the telephone 700 is in the closed position. In the alternative, such software may also be invoked for any gestures from the second side 716 of the touchpad, or upon its selection by the user.

Figure 8:
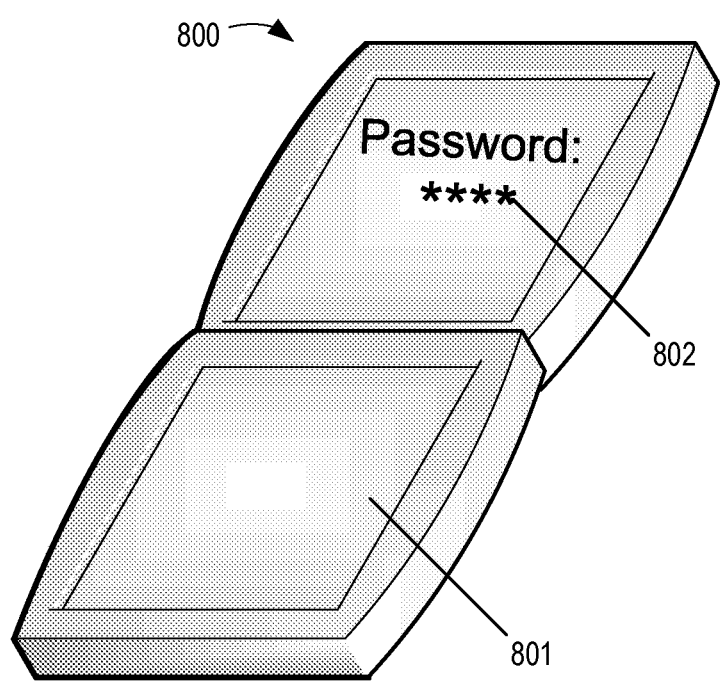
FIG. 8 illustrates the track pad device implemented as a Personal Digital Assistant.

Referring now to FIG. 8, a track pad device in accordance with another embodiment of the invention is incorporated into a personal digital assistant ("PDA") 800 configured to require an "open" configuration to access secure functions or information. PDA 800 is shown in an open configuration. The PDA 800 is configured with a tracing function as shown above with reference to FIG. 7B, wherein touch events on the track pad element 801 are mimicked as an image on the display. Although the tracing function may be activated while the PDA is closed, this tracing function is deactivated upon the track pad being in the open position, so that secure information is not displayed. Instead, a non-descriptive placeholder 802 is displayed in place of the input characters.

Figure 9A:
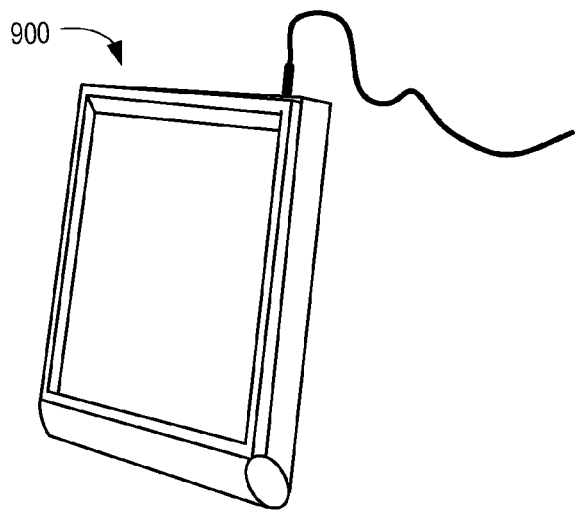
FIGS. 9A-B show a perspective view and a screen shot, respectively, of Digital Media Player configured so the elements form a 0-degree angle.
Figure 9B:
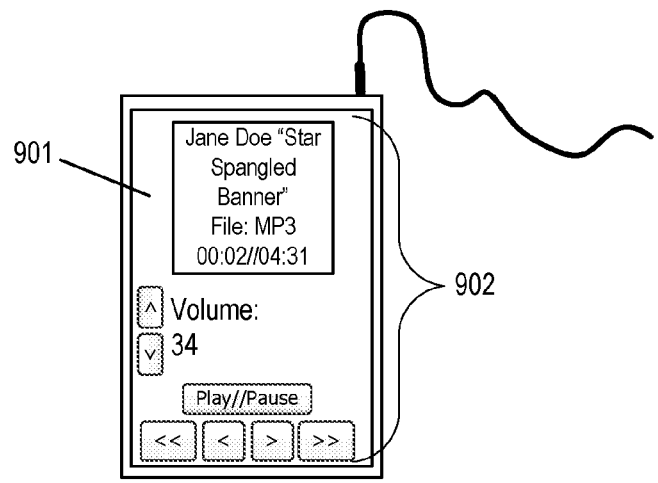

FIGS. 9A-11B illustrate track pad devices in accordance with the invention incorporated within Digital Media Players ("DMP") 900. DMP 900 is configured to require a configuration where the elements (e.g., processor element and translucent panel element) form a zero to 15 degree angle to play media files. FIGS. 9A-B show a perspective view and a front view, respectively, of DMP 900 configured so the elements form a 0-degree angle. DMP 900 automatically enables a GUI for playing media files, including media play controls 902, upon the elements forming a zero to 15 degree angle. A user may interact with the GUI in a touch screen context by touching the second side of the array element 901.

Figure 10A:
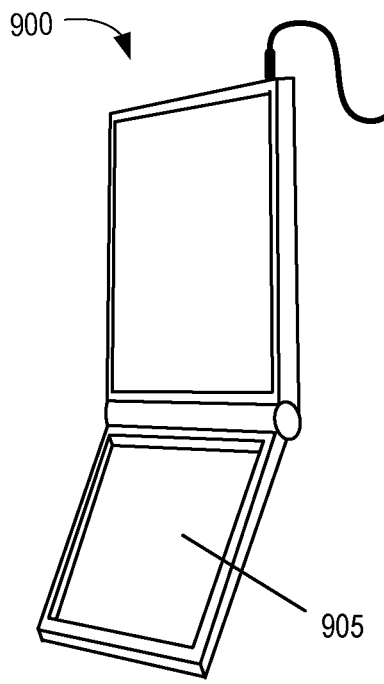
FIGS. 10A-B show a perspective view and a screen shot, respectively, of DMP configured so the elements form a 120-degree angle.
Figure 10B:
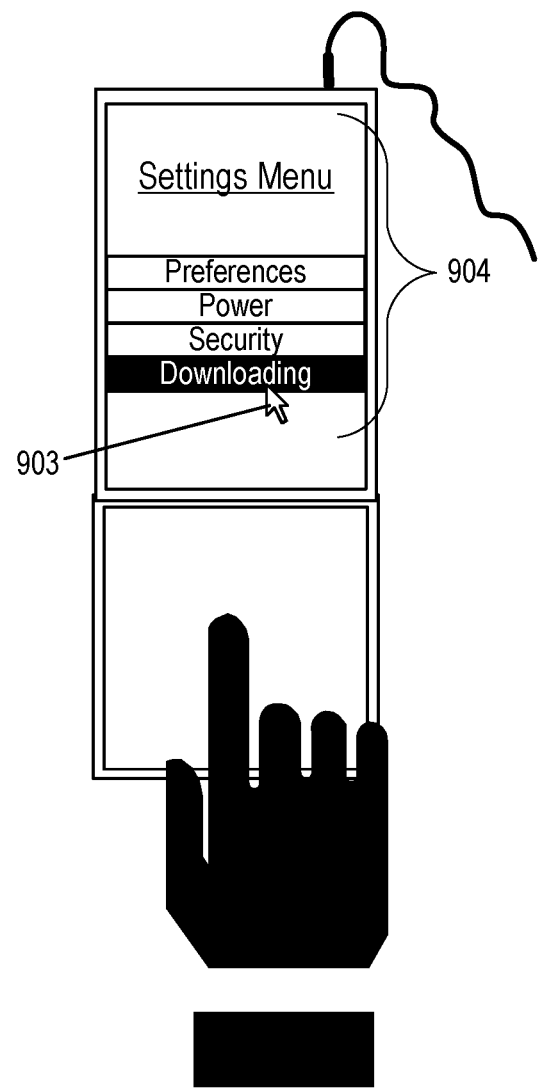

DMP 900 may be further configured to adjust its operation when the elements form a 15.1 to 200 degree angle. FIGS. 10A-B show a perspective view and a front view, respectively, of DMP 900 configured so the elements form an approximate 120-degree angle. DMP 900 automatically enables a GUI for changing settings and configurations, including a settings menu 904, upon the elements forming a 15.1 to 200 degree angle. A user may navigate the GUI by positioning a cursor 903 over desired menu choices and performing a selection gesture on the first side of the array element 905.

Figure 11A:
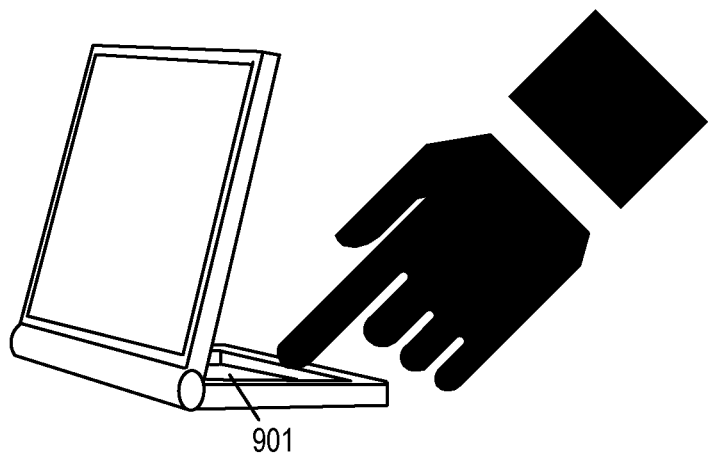
FIGS. 11A-B show a perspective view and a screen shot, respectively, of DMP configured so the elements form a 260-degree angle.
Figure 11B:
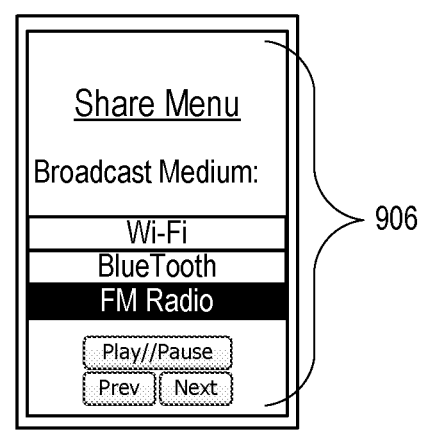

When the elements of DMP 900 form an angle of greater than approximately 200 degrees, a "share" function display may be activated wherein the digital media is broadcast on a medium, such as FM radio, BlueTooth, Wi-Fi, or Wi-Max. In this configuration the second side of the array element 901 may be used to toggle between the broadcast media and skip to the next or previous media item by using gestures. FIGS. 11A-B show a perspective view and a screen shot, respectively, of DMP 900 wherein the elements form an approximate 260-degree angle. DMP 900 automatically enables a share function GUI for broadcasting digital media, including a share menu 906, upon the elements forming a greater-than-200 degree angle.

FIGS. 12A-13C illustrate a track pad device in accordance with the invention that has been incorporated in a laptop computer 1200. Laptop 1200 is configured so that when the laptop is in a closed position, a specialized functionality is invoked. Because the laptop has the track pad positioned over the display screen, it may be configured to activate a touch screen mode while in the closed position. This touch screen mode may include a smaller display to conserve power, a display with fewer and/or larger icons to facilitate the use of the closed laptop during travel, or a specialized "mobile touch screen" functionality.

Figure 12A:
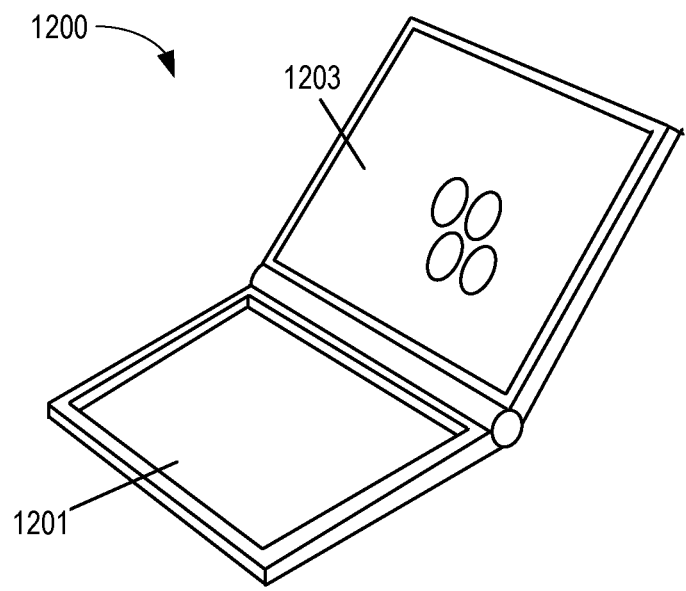
FIGS. 12A-B show a perspective view and a screen shot, respectively, of laptop configured so the elements form a 120-degree angle.
Figure 12B:
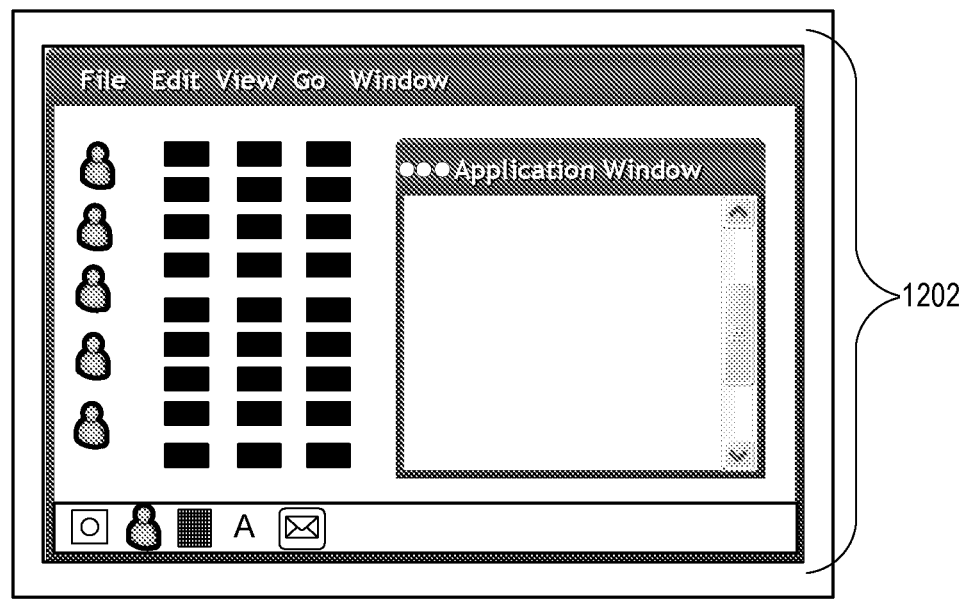

FIGS. 12A-B show a perspective view and a screen shot, respectively, of laptop 1200 configured so the elements form a 120-degree angle. Laptop 1200 may be configured so that when it is open at an angle of 160 degrees or less, the laptop 1200 utilizes a standard GUI 1202 displayed on the display screen 1203, the first side of the array element 1201 may be used as a keyboard or array element, and the laptop has normal laptop functionality. The second side of the array element may also be used for input or it may be deactivated.

Figure 13A:
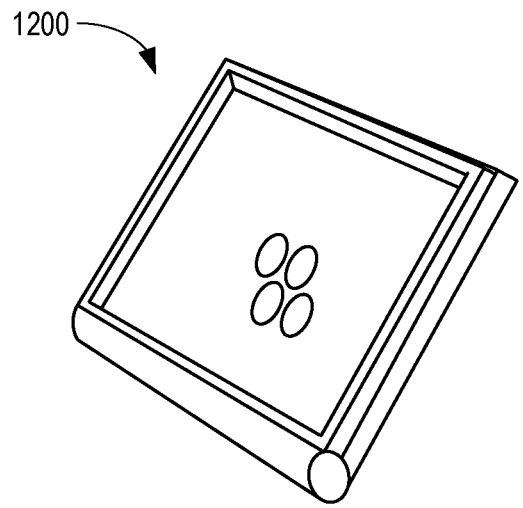
FIGS. 13A-B show a perspective view and a screen shot, respectively, of laptop in a closed position.
Figure 13B:
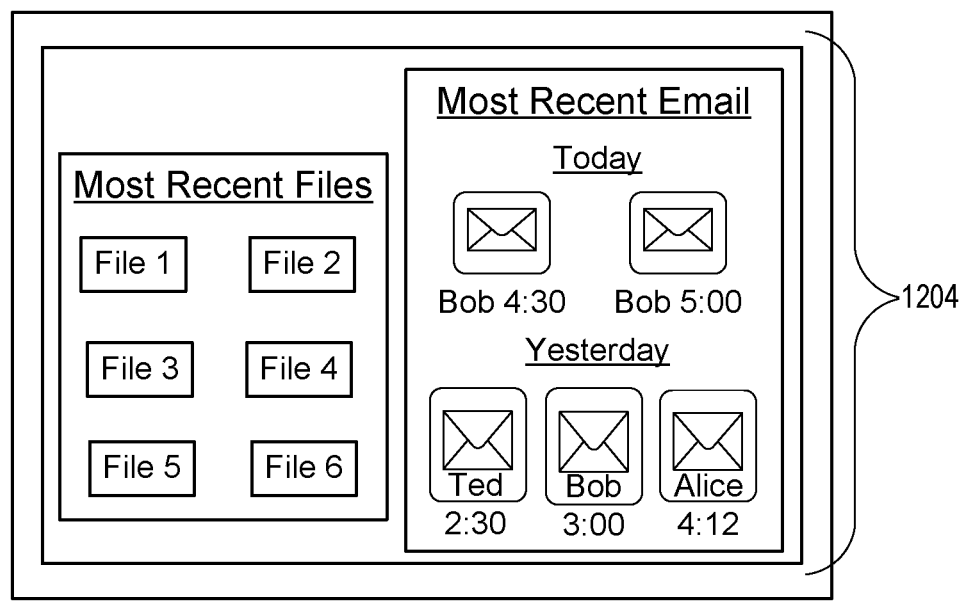

FIGS. 13A-B show a perspective view and a screen shot, respectively, of laptop 1200 in a closed position. Laptop 1200 automatically enables a specialized functionality, including a mobile GUI 1204 with touch screen interaction, upon the laptop being closed.

Figure 14A:
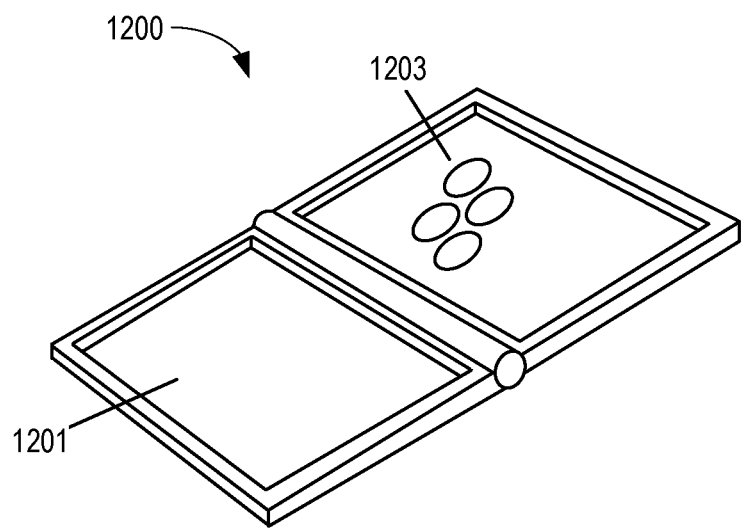
FIGS. 14A-C show a laptop in a "lain flat" configuration.
Figure 14B:
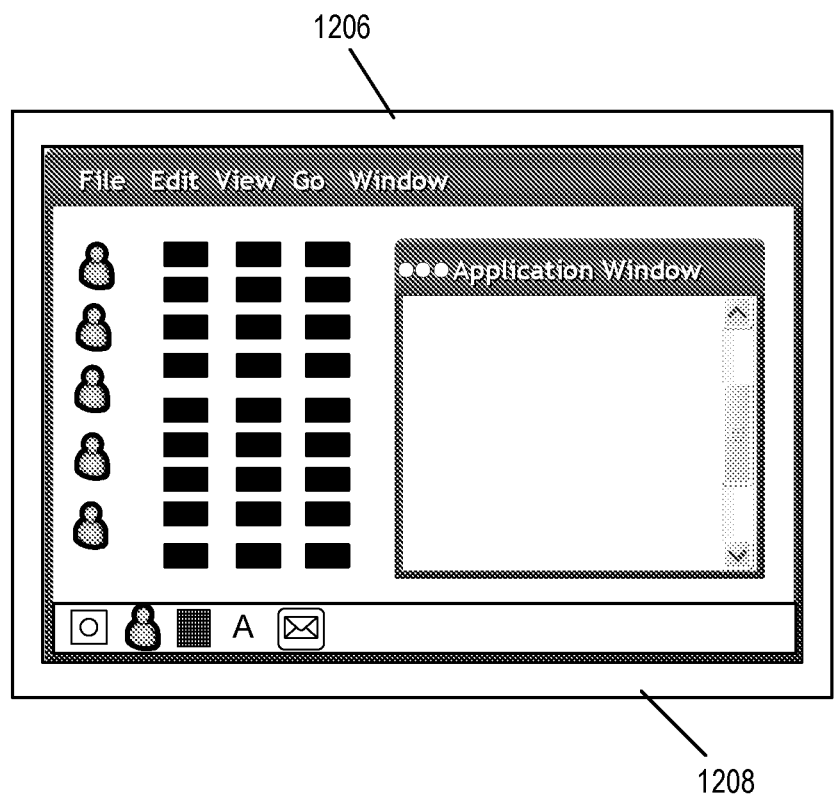
Figure 14C:
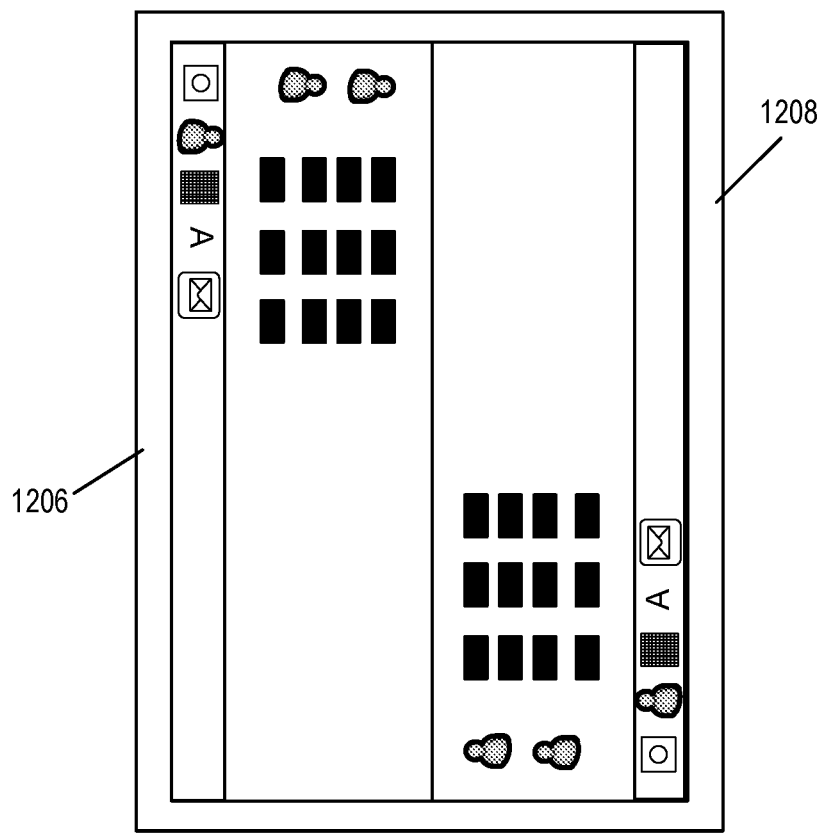

FIGS. 14A-B show a perspective view and a screen shot, respectively, of laptop 1200 in a "lain flat" configuration. Laptop 1200 is configured so that when the laptop is open to an angle of greater than approximately 160 degrees, a "share" function is activated, rotating the display 180 degrees in the plane from the usual display, or "upside down" (i.e., the "top" of the screen 1206 faces the user and the array element, and the "bottom" of the screen 1208 faces the share recipient), so that information may be shared with someone across a table. The first side of the array element 1201 may be used as a keyboard or touch pad. Additional functionality changes may be implemented to facilitate sharing of information, such as presenting some information oriented towards the user and some information oriented towards the person to be shared with, as in the split screen illustrated in FIG. 14C.

Figure 15A:
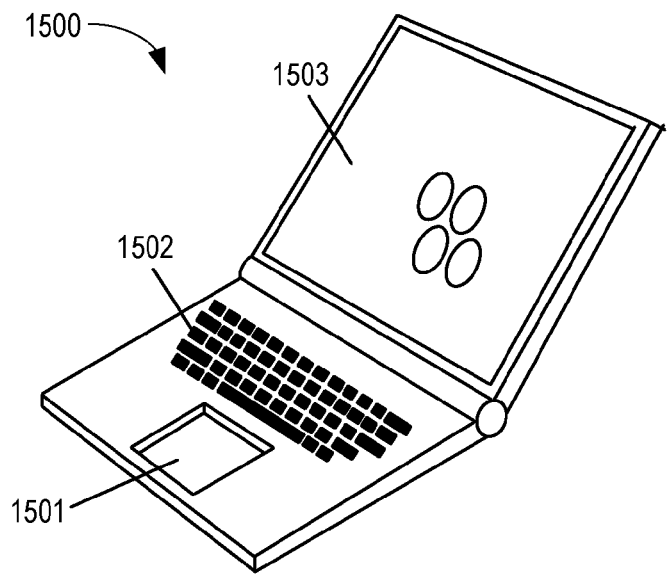
FIGS. 15A and 15B show a perspective view and a screen shot, respectively, of the laptop in an open configuration.
Figure 15B:
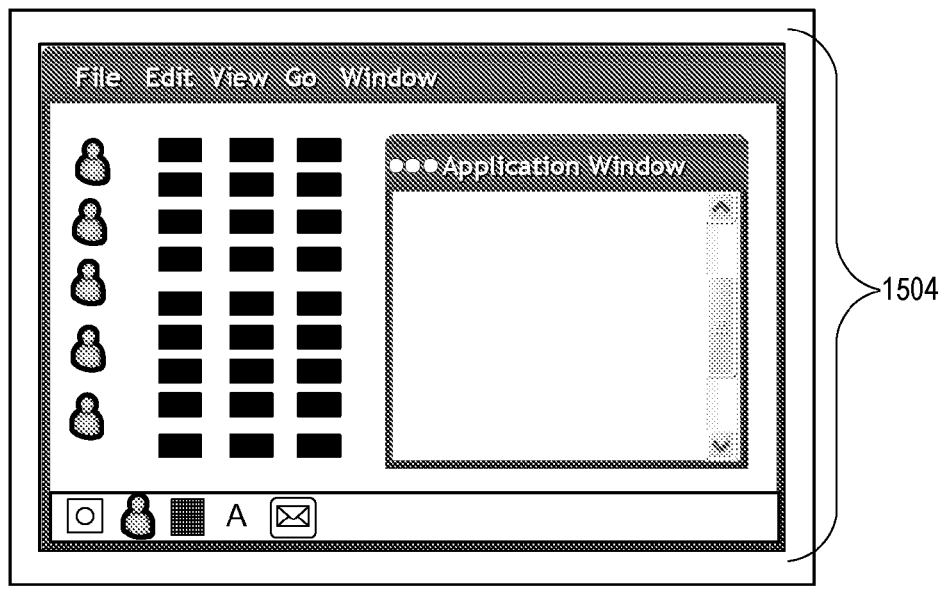

FIGS. 15A-D illustrate a laptop computer system 1500 with both a traditional keyboard and a dual-sided array element in accordance with the invention. FIGS. 15A and 15B show a perspective view and a screen shot, respectively, of the laptop 1500 in an open configuration. The array element 1501 is positioned below the keyboard 1502, and the first side of the array element may be used as a touch pad by the user. The laptop 1500 utilizes a standard GUI 1504 displayed on the display screen 1503.

Figure 15C:
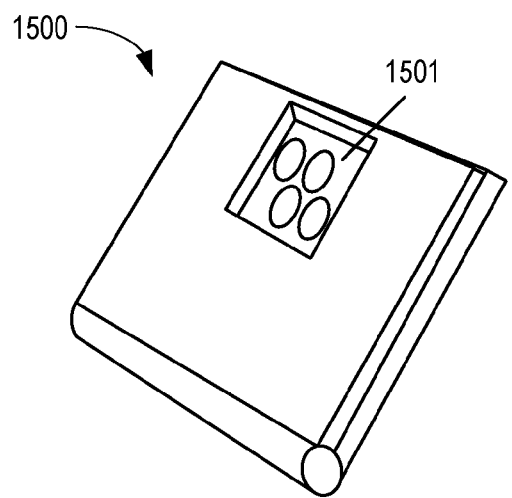
FIGS. 15C and 15D show a perspective view and a screen shot, respectively, of the laptop in a closed configuration.
Figure 15D:
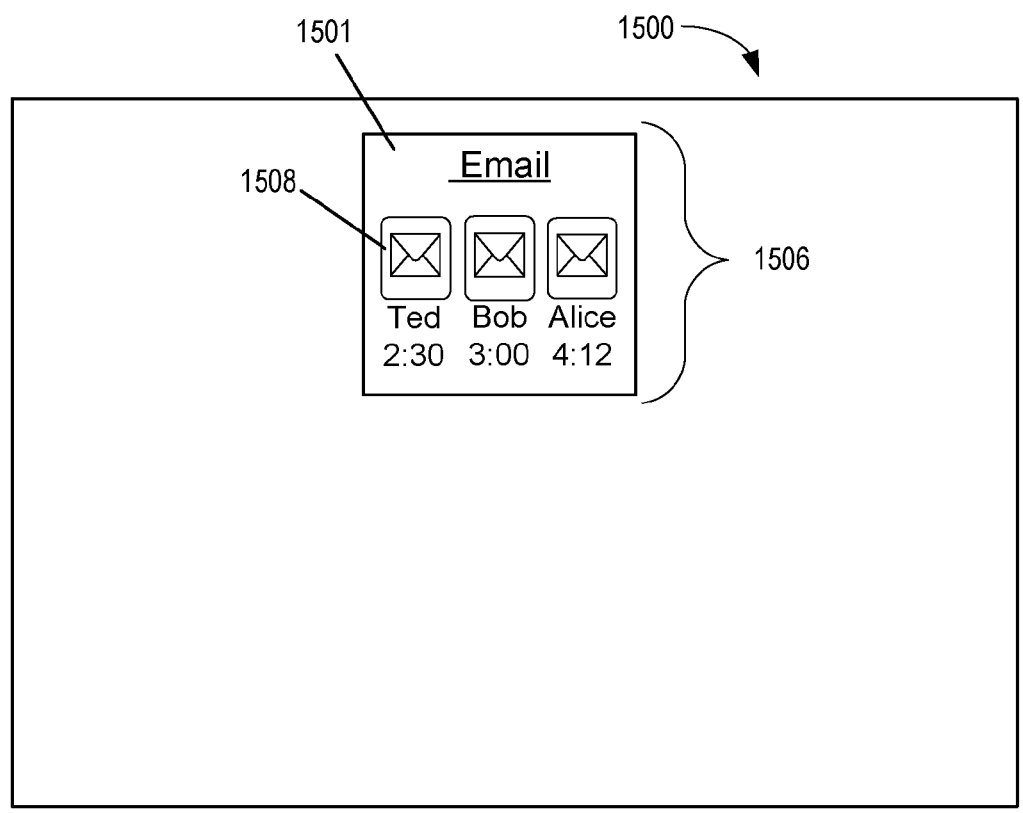

FIGS. 15C and 15D show a perspective view and a screen shot, respectively, of the laptop 1500 in a closed configuration. In this configuration, laptop 1500 automatically enables a specialized limited "email only" functionality, including a mobile GUI 1506 which the user may interact with in a touch screen mode, by pressing on the second side of the array element directly above email icons 1508 displayed on the portion of the display screen beneath the array element 1501. In some implementations, such as an OLED, only the portion of the display screen beneath the array element 1501 is active, allowing power savings. While the specialized functionality disclosed here is limited to checking email, in other embodiments the specialized functionality may take any form as will occur to those of skill in the art.

Figure 16A:
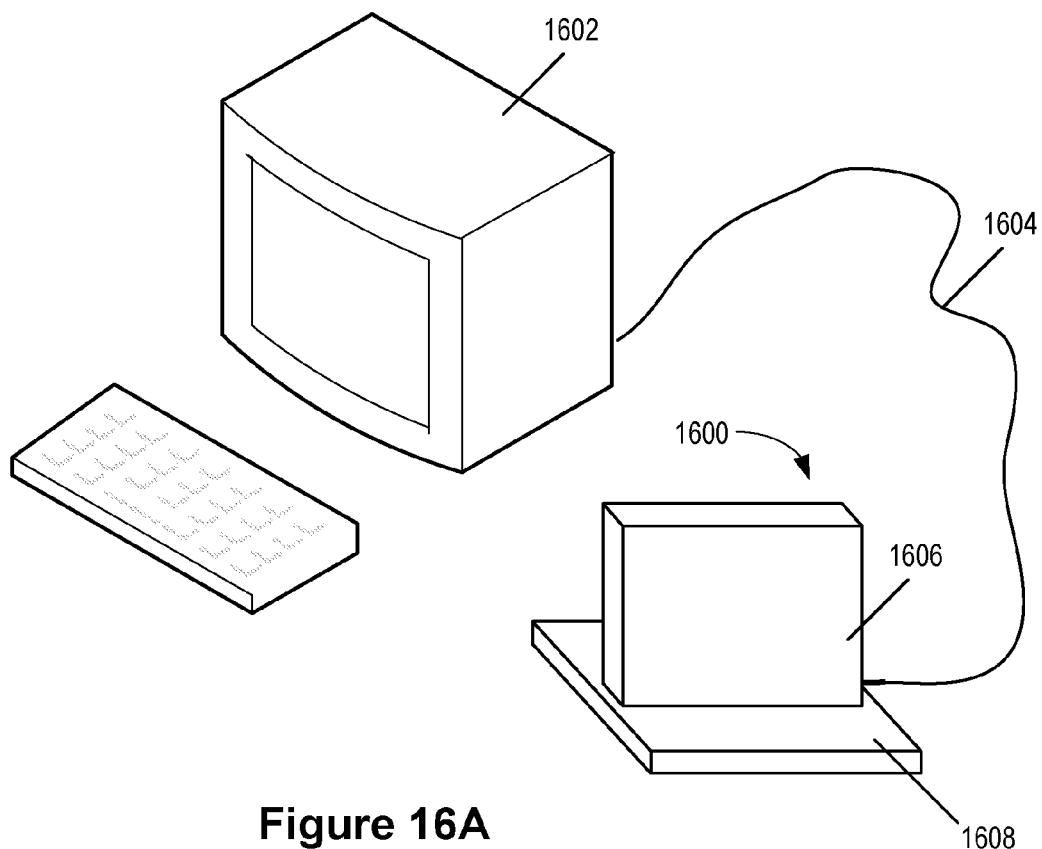
FIGS. 16A and 16B show the track pad device as an external stand-alone input device.
Figure 16B:
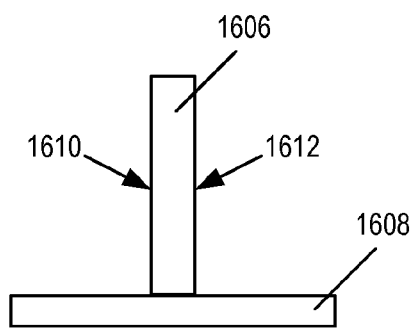

FIGS. 16A and 16B show the track pad device as an external stand-alone input device 1600. FIG. 16A shows the input device 1600 connected to the computer host device 1602 by a connector cable 1604. FIG. 16B shows the end view of the input device 1600. The connector cable 1604 shown is a USB cable, although other connector cables may also be used. The host device 1602 could be a traditional desktop computer, a laptop, a workstation, or any other computing device with an input-output interface. Referring to FIG. 16B, the input device 1600 has a capacitive array element 1606, having a first vertical surface 1610 and an opposing second vertical surface 1612, mounted on a horizontal base 1608. This implementation may be constructed of Flame Resistant 4 ("FR-4") printed circuit board material or a similar non-translucent material. Touch events are translated into computer events by the input device 1600. The host device 1602 interprets the computer events and thereafter performs an operation based on the touch event, allowing the user to interact with a graphical user interface ("GUI") on the host device. As discussed above, input device 1600 may be adapted to receive inputs from both vertical surfaces 1610 and 1612 simultaneously. As noted above, using (accepting and distinguishing) input from both sides of input device 1600 simultaneously allows six degrees of freedom by translating gestures into lateral movement in three dimensions as well as the rotational movements pitch, yaw, and roll. This functionality enables or enhances panning, scrolling, zooming, and selecting and may be used to add greater control and ease-of-use in applications requiring three dimensional maneuvering, such as computer assisted design ("CAD"), gaming, and multimedia editing applications.

It should be understood that the inventive concepts disclosed herein are capable of many modifications. Such modifications may include modifications in the implementation of the capacitive arrays, the manner in which input from the capacitive array is processed, the manner and extent of configurability of the array element with respect to the display element, and the particular manner in which functionality is altered in response to possible configurations. To the extent such modifications fall within the scope of the appended claims and their equivalents, they are intended to be covered by this patent.

What is claimed is:

1. A track pad device, comprising:
   a capacitive array element, the capacitive array element having a first surface and an opposing second surface;
   wherein the capacitive array element further comprises:
      a plurality of first sensing lines for transmitting a first signal indicative of a change in capacitance when an object comes into close proximity to, or touches the first surface,
      a plurality of second sensing lines for transmitting a second signal indicative of a change in capacitance when an object come into close proximity to, or touches the second surface, and
      a plurality of driving lines formed between the first and second sensing lines on a single layer and configured for interacting with the plurality of first and second sensing lines to form capacitive sensing nodes for both the first and second surfaces.

2. The track pad device of claim 1, further comprising a display element, wherein the track pad device is adapted for connection through a computer bus to a processor unit configured to drive the display element to provide visual output and further to accept the first and second signals as input signals.

3. The track pad device of claim 2 wherein first and second signals provide sufficient data for the processor unit to generate a cursor movement with six degrees of freedom according to the first and second signals.

4. The track pad device of claim 1, further comprising a processor unit configured to accept the first and second signals as input signals and produce a combined movement signal expressing movement with six degrees of freedom.

5. The track pad device of claim 1 wherein the track pad device is adapted to recognize multiple simultaneous touch events.

6. The track pad device of claim 1, further comprising a display element, wherein the capacitive array element is translucent and configurable to cover at least a portion of the display element in a manner that the display element may be viewed through the translucent capacitive array element.

7. The track pad device of claim 6, further comprising a processor unit configured to drive the display element to provide visual output and further to accept the first and second signals as input signals.

8. The track pad device of claim 7 wherein computer instructions are executed by the processor unit based on the configuration of the translucent capacitive array element with respect to the display element.

9. The track pad device of claim 7 wherein the track pad device is adapted to recognize multiple simultaneous touch events.

10. The track pad device of claim 9 wherein the recognition of multiple touch events is based on the configuration of the translucent capacitive array element with respect to the display element.

11. The track pad device of claim 10 wherein the configuration of the translucent capacitive array element with respect to the display element determines an activation status of the recognition of multiple touch events by the track pad device.

12. The track pad device of claim 9 wherein a response to a recognized multiple touch event is based on the configuration of the translucent capacitive array element with respect to the display element.

13. The track pad device of claim 12 wherein the configuration of the translucent capacitive array element with respect to the display element determines which one of a plurality of signal processing methods are used to recognize a multiple touch event.

14. The track pad device of claim 13 wherein the signal processing methods include digital signal processing methods for filtering raw data.

15. The track pad device of claim 13 wherein the signal processing methods comprise generating gradient data.

16. The track pad device of claim 9 wherein the configuration of the translucent capacitive array element with respect to the display element determines a maximum number of simultaneous multipoint touch events that may be recognized by the track pad device.

17. The track pad device of claim 16 wherein the configuration of the translucent capacitive array element with respect to the display element determines a set of identifiable touch events.

18. The track pad device of claim 7 wherein the configuration of the translucent capacitive array element with respect to the display element determines which of the first and second signals is accepted as an input signal by the processor unit.

19. A cellular telephone device comprising a track pad device in accordance with claim 1.

20. A personal digital assistant comprising a track pad device in accordance with claim 1.

21. A digital media player comprising a track pad device in accordance with claim 1.

22. A laptop computer system comprising a track pad device in accordance with claim 1.

23. The laptop computer system of claim 22, wherein power usage is determined by the configuration of the translucent capacitive array element with respect to a display element.

24. The track pad device of claim 1, further comprising a display element, and a track pad controller configured for interpreting touch events detected at the capacitive array element in accordance with the physical configuration of the display element and the capacitive array element and a programmable configurations file.

25. A control apparatus for an electronic device comprising:
a translucent panel including one or more layers, the translucent panel having a first side and an opposing second side, with the translucent panel including capacitive arrays for producing signals in response to contact, the contact being either on the first side or on the second side; and
wherein the translucent panel further comprises
a plurality of first sensing lines for transmitting a first signal indicative of a change in capacitance when an object comes into close proximity to, or touches the first side,
a plurality of second sensing lines for transmitting a second signal indicative of a change in capacitance when an object comes into close proximity to, or touches the second side, and
a plurality of driving lines formed between the first and second sensing lines on a single layer and configured for interacting with the first and second sensing lines to form capacitive sensing nodes for both the first and second sides.

26. The control apparatus of claim 25, further comprising a display screen wherein the configuration of the translucent panel with respect to the display screen determines an activation status of control apparatus functions.

27. The control apparatus of claim 25, further comprising a processing unit configured for interpreting touch inputs received at the translucent panel in accordance with a particular configuration of the display screen and the translucent panel and a programmable configurations file.

28. A method of graphical user interface manipulation comprising:
capacitively coupling drive signals from a plurality of drive lines in a single drive layer positioned between first and second sense layers of a capacitive array element onto a plurality of sense lines on each of the first and second sense layers to form capacitive sensing nodes, the first and second sense layers adjacent to first and second surfaces;
receiving from the capacitive array element a first signal indicative of a change in capacitance generated when an object comes into close proximity, or touches, the first surface of the capacitive array element and a second signal indicative of a change in capacitance generated when an object comes into close proximity, or touches, the second surface of the capacitive array element; and
manipulating the graphical user interface according to the first and second signals.

29. The method of claim 28 wherein manipulating the graphical user interface according to the first and second signals comprises manipulating a cursor.

30. The method of claim 29 wherein manipulating a cursor comprises using the first and second signals to generate a cursor movement having translational movement in three dimensions.

31. The method of claim 29 wherein manipulating a cursor comprises using the first and second signals to generate a cursor movement having rotational movement about two or more perpendicular axes.

32. The method of claim 29 wherein manipulating a cursor comprises using the first and second signals to generate a cursor movement having six degrees of freedom.

33. The method of claim 28 wherein manipulating the graphical user interface according to the determined device functionality and the first and second signals comprises processing the first and second signals with signal processing methods to recognize a multiple touch event.

34. The method of claim 33 wherein processing the first and second signals with signal processing methods comprises filtering raw data.

35. The method of claim 33 wherein processing the first and second signals with signal processing methods comprises generating gradient data.

36. The method of claim 35 wherein processing the first and second signals with signal processing methods further comprises calculating boundaries for touch regions based on the gradient data.

37. The method of claim 33 wherein processing the first and second signals with signal processing methods comprises calculating coordinates for each touch region.

38. A track pad device, comprising:
a capacitive array element having a first surface and an opposing second surface;
wherein the track pad device is adapted to enable or disable control apparatus functions according to a configuration of the capacitive array element, the control apparatus functions being programmably variable;
wherein the capacitive array element further comprises
a plurality of first sensing lines for transmitting a first signal indicative of a change in capacitance when an object comes into close proximity to, or touches the first surface,
a plurality of second sensing lines for transmitting a second signal indicative of a change in capacitance when an object comes into close proximity to, or touches the second surface and
a plurality of driving lines formed between the first and second sensing lines on a single layer and configured for interacting with the first and second sensing lines to form capacitive sensing nodes for both the first and second surfaces.

39. The track pad device of claim 38, further comprising a display element and a track pad controller configured for interpreting touch events detected at the capacitive array element in accordance with the configuration of the display element and the capacitive array element and an adjustable configurations file.

40. The track pad device of claim 38, further comprising a display element and wherein the capacitive array element is translucent and configurable to cover at least a portion of the display element in a manner that the display element may be viewed through the translucent capacitive array element.

41. The track pad device of claim 38, further comprising a display element, wherein the capacitive array element is slidably configurable with respect to the display element.

42. A dual touch surface capacitive array element, comprising:
a plurality of first sensing lines in a first sensing layer for transmitting a first signal indicative of a change in capacitance when an object comes into close proximity to, or touches a first surface;
a plurality of second sensing lines in a second sensing layer for transmitting a second signal indicative of a change in capacitance when an object comes into close proximity to, or touches a second surface; and
a plurality of driving lines in a single driving layer between the first and second sensing layers and configured for interacting with the first and second sensing lines to form capacitive sensing nodes for both the first and second surfaces.

43. The dual touch surface capacitive array element of claim 42, wherein the capacitive array element is configured to generate a first signal indicative of a change in capacitance when an object comes into close proximity to, or touches, the first surface and a second signal indicative of a change in capacitance when an object comes into close proximity to, or touches, the second surface.

44. A method for providing dual surface touch sensing, comprising:
capacitively coupling drive signals from a plurality of drive lines in a drive layer positioned between first and second sense layers onto a plurality of sense lines in each of the first and second sense layers, the first and second sense layers adjacent to first and second opposing surfaces of a capacitive array element; and
generating a first signal indicative of a change in capacitance between the drive line in the drive layer and a sense line in the first sense layer when an object comes in close proximity to, or touches, the first surface, and generating a second signal indicative of a change in capacitance between the drive line in the drive layer and a sense line in the second sense layer when an object comes in close proximity to, or touches, the second surface.

* * * * *

UNITED STATES PATENT AND TRADEMARK OFFICE
CERTIFICATE OF CORRECTION

| | | |
|---|---|---|
| PATENT NO. | : 8,471,822 B2 | Page 1 of 1 |
| APPLICATION NO. | : 11/470579 | |
| DATED | : June 25, 2013 | |
| INVENTOR(S) | : Chris A. Ligtenberg | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1054 days.

Signed and Sealed this
Sixteenth Day of December, 2014

Michelle K. Lee
*Deputy Director of the United States Patent and Trademark Office*